United States Patent [19]

McHugh

[11] Patent Number: 5,409,066

[45] Date of Patent: Apr. 25, 1995

[54] ADJUSTABLE SPRINKLER HEAD POSITIONING ASSEMBLY

[75] Inventor: George J. McHugh, Broomall, Pa.

[73] Assignee: AGF Manufacturing, Inc., Warren, N.J.

[21] Appl. No.: 931,920

[22] Filed: Aug. 18, 1992

Related U.S. Application Data

[63] Continuation-in-part of Ser. No. 810,129, Dec. 19, 1991, abandoned, which is a continuation-in-part of Ser. No. 663,029, Mar. 1, 1991, abandoned, which is a continuation-in-part of Ser. No. 531,098, May 31, 1990, abandoned, which is a continuation-in-part of Ser. No. 518,469, May 3, 1990, abandoned.

[51] Int. Cl.$^6$ .................. F16L 27/00; F16L 27/06; B05B 15/06; B05B 15/08
[52] U.S. Cl. .................. 169/52; 169/16; 169/35; 239/587.1; 285/275
[58] Field of Search .................. 169/16, 37, 52, 35; 239/587.1; 285/275, 346, 355, 372, 418

[56] References Cited

U.S. PATENT DOCUMENTS

| | | |
|---|---|---|
| 222,195 | 12/1879 | McGowan . |
| 663,277 | 12/1900 | Horvath . |
| 982,836 | 1/1911 | Ley et al. . |
| 991,501 | 5/1911 | Graves . |
| 1,058,968 | 4/1913 | Hammond . |
| 1,373,324 | 3/1921 | Gomez . |
| 1,785,095 | 12/1930 | Patterson . |
| 2,164,390 | 7/1939 | Dickerson . |
| 2,262,585 | 11/1941 | Irmischer . |
| 2,746,773 | 5/1956 | Bily . |
| 2,892,641 | 6/1959 | Ford . |

(List continued on next page.)

FOREIGN PATENT DOCUMENTS

| | | |
|---|---|---|
| 455539 | 7/1949 | Italy . |
| 53-89299 | 5/1978 | Japan . |
| 9537 | of 1909 | United Kingdom . |
| 201669 | 8/1923 | United Kingdom . |

OTHER PUBLICATIONS

Installation instructions regarding the "Gruvlok 'Clamp-T' with U-Bolt".
Installation and sizing document for Styles 920 and 921 Mechanical-T Bolted Branch Outlet.
Installation and sizing document for Style 920 and 929 Mechnical-T Crosses.
Installation procedure regarding "Weldolet" from B. F. Gilmour Co., Inc.
Brochure describing "Adjusting Wet Drop Nipple" for
(List continued on next page.)

Primary Examiner—Andres Kashnikow
Assistant Examiner—Lissi Mojica
Attorney, Agent, or Firm—Burns, Doane, Swecker & Mathis

[57] ABSTRACT

An adjustable sprinkler head positioning assembly is disclosed that includes a first conduit member and a second conduit member that are selectively positionable relative to each other and to a drop line fitting so as to position a sprinkler head at a desired location. The first and second conduit members each have an inlet portion and an outlet portion that are offset relative to each other by a predetermined distance. The sprinkler head is positionable anywhere within a circle having a radius equal to the sum of the offsetting distances between the inlet and outlet portions of each conduit member. Elbow couplings further increase versatility. The elbow couplings may have an inlet positioned at a 45° angle or a 90° angle relative to an outlet.

A drop line fitting is weldable to a sprinkler drop line and includes a socket for receiving sprinkler system plumbing such as the first and second conduit members.

A drop line fitting is releasably secured to a sprinkler pipeline and includes either a socket for receiving sprinkler system plumbing such as the first conduit member or includes a portion having a smooth outer circumferential surface to be received by a socket of sprinkler system plumbing such as the first conduit member.

28 Claims, 20 Drawing Sheets

U.S. PATENT DOCUMENTS

| | | |
|---|---|---|
| 3,262,719 | 7/1966 | Gemma . |
| 3,318,531 | 5/1967 | Funk . |
| 3,499,670 | 3/1970 | DeWoody . |
| 3,575,351 | 4/1971 | Warren . |
| 3,752,507 | 8/1973 | Maurer et al. . |
| 4,071,266 | 1/1978 | Mountford . |
| 4,083,410 | 4/1978 | Anderson . |
| 4,091,523 | 5/1978 | Riecke . |
| 4,304,424 | 12/1981 | Hansen . |
| 4,484,634 | 11/1984 | Swanson et al. . |
| 4,596,362 | 6/1986 | Pralle et al. . |
| 4,699,217 | 10/1987 | McLennan et al. . |
| 4,778,108 | 10/1988 | Richards . |
| 4,785,887 | 11/1988 | Miller . |
| 4,822,080 | 4/1989 | Darish . |
| 4,834,186 | 5/1989 | Ballard . |
| 4,946,202 | 8/1990 | Perricone . |
| 4,957,314 | 9/1990 | Basile et al. . |
| 4,976,468 | 12/1990 | Shpigel . |

OTHER PUBLICATIONS fire protection water supply systems, from Allied Piping Products Company, Inc.

Installation and sizing document regarding the Style 929 FIT Outlet/Mechanical T.

P. 18 of a catalog dated 1992, from Grinnell regarding various "SOCK-IT" fittings.

Pp. 80–85 of Victaulic Mechanical Piping Systems General Catalog dated 1991 regarding FIT (Fast Installation Technique) fittings.

Victaulic Price List 90–In particular the Mechanical-T Style 929 and the 90° Elbow Style 961 on p. 30. Other "Fast Installation Technique Products" on pp. 30–31.

Riken Brochure, Jul. 1987.

Installation instructions regarding the "Mechanical-T" Style 921 fitting from Victaulic.

The Automatic Sprinkler Systems Handbook pp. 78–79, 81 and 270–272.

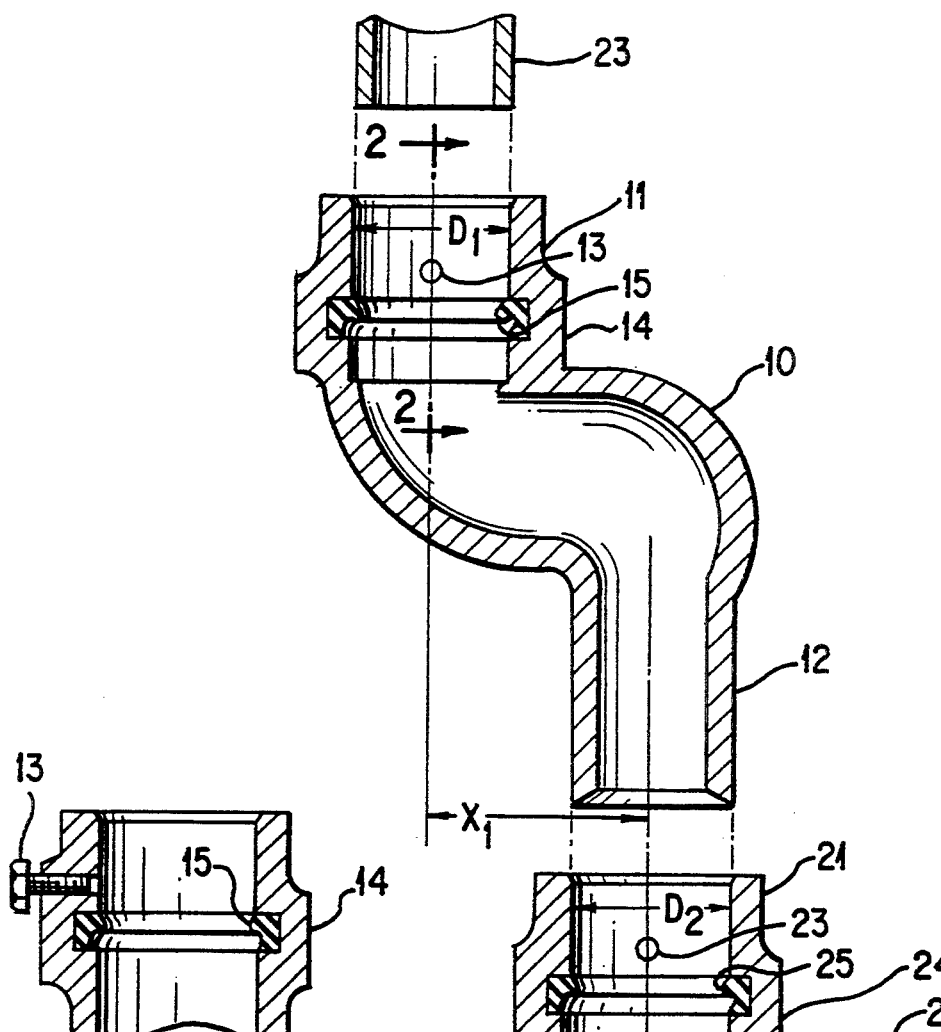
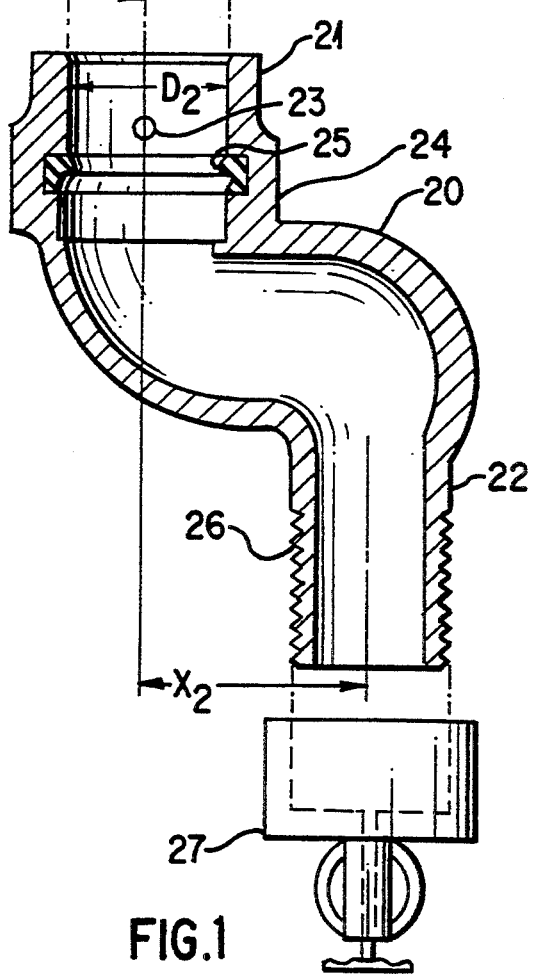
FIG. 2
FIG. 1

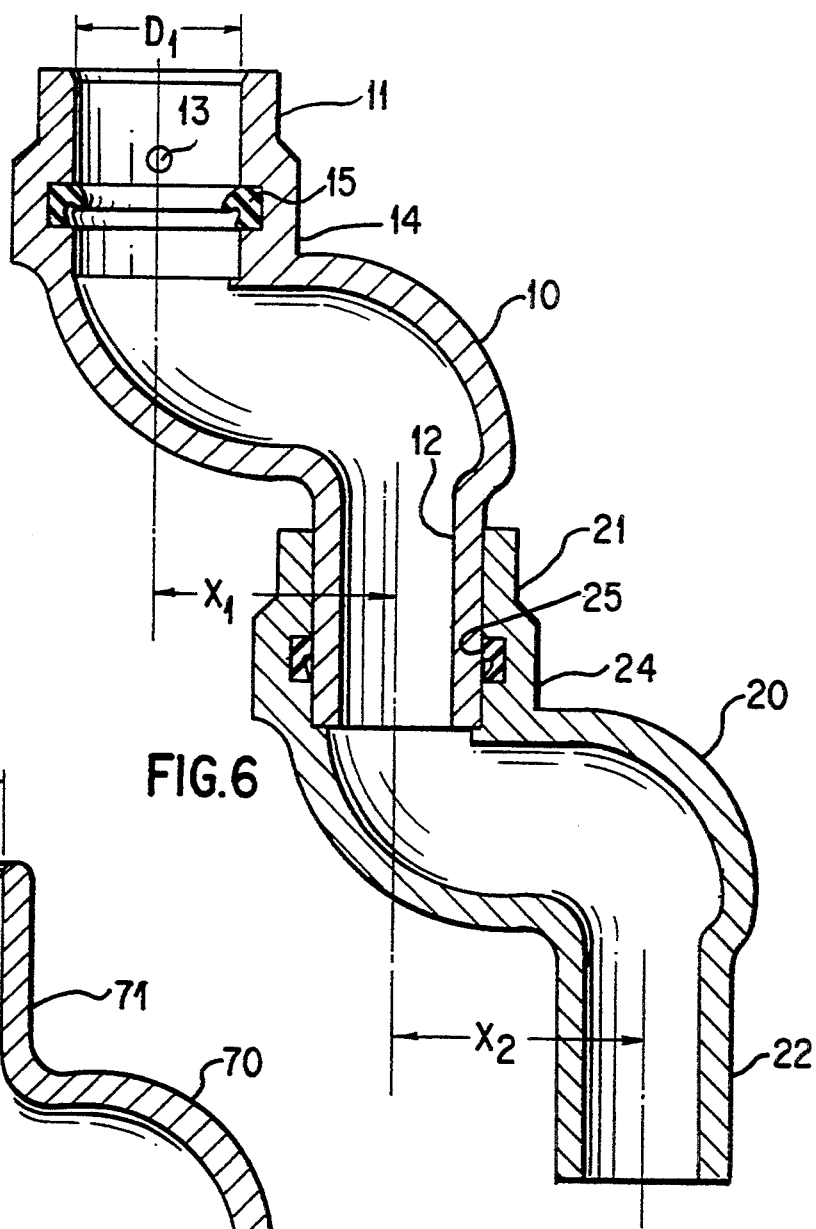
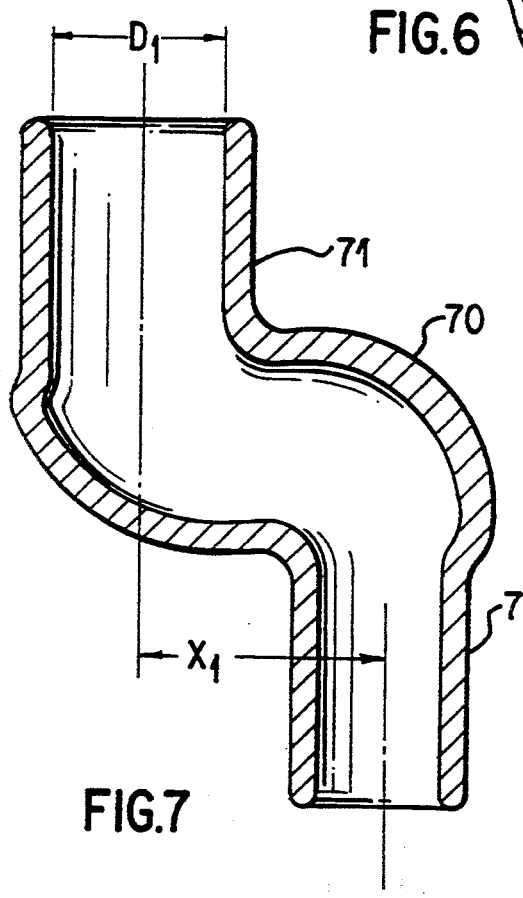
FIG.7
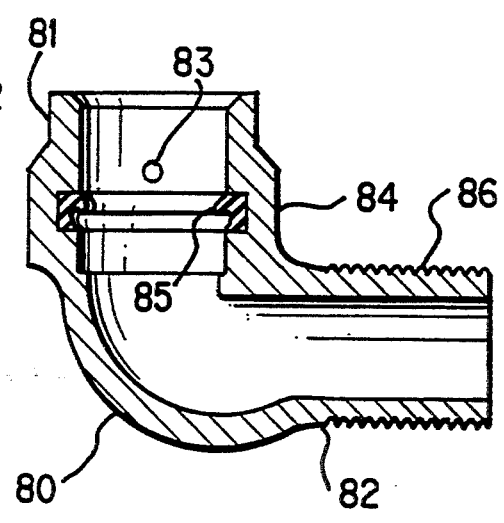
FIG. 8

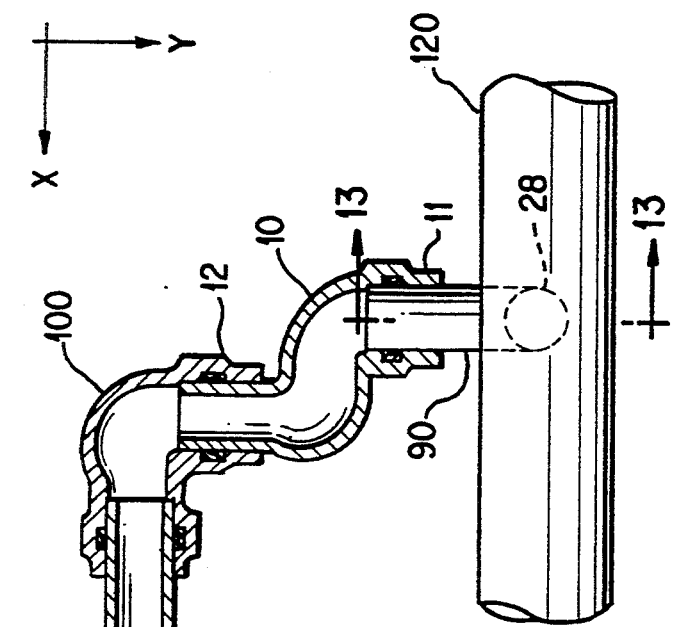
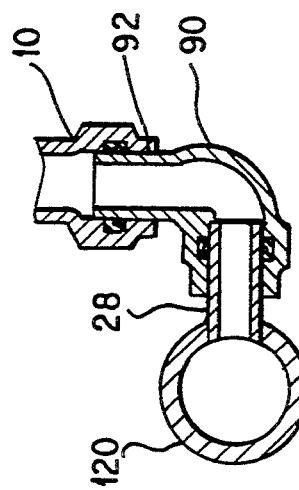
FIG. 12
FIG. 13

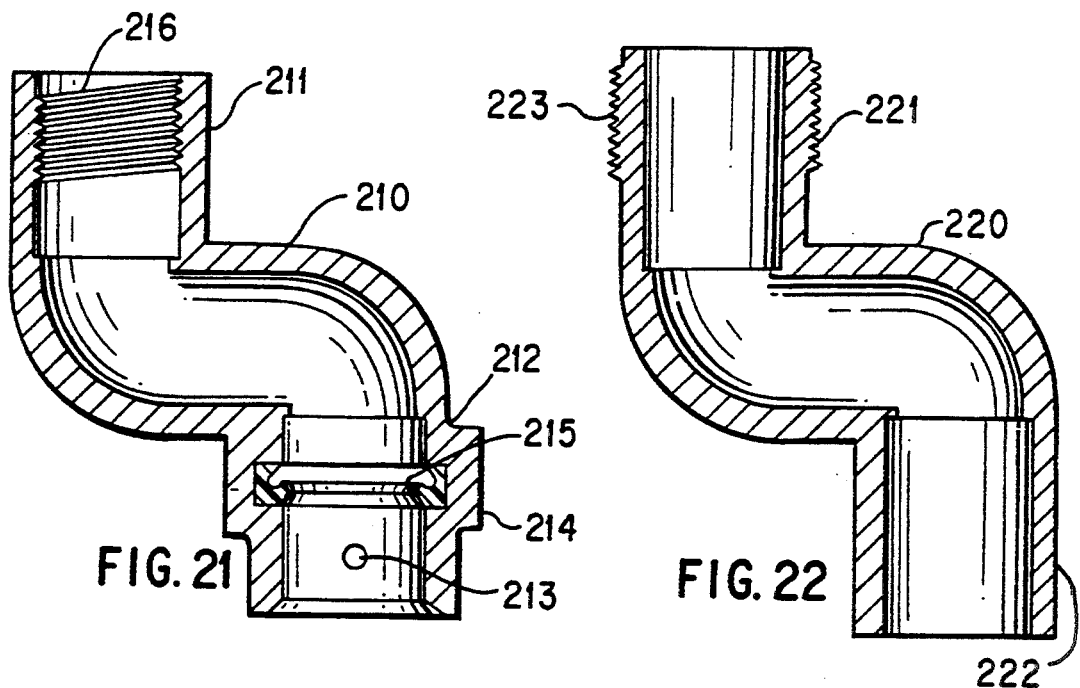
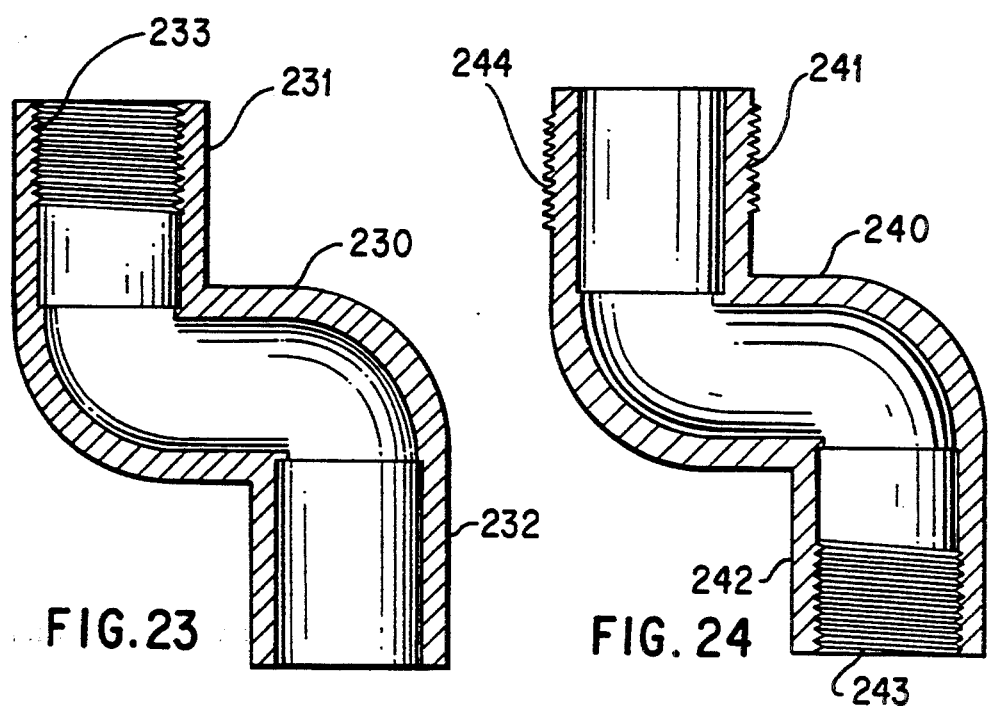

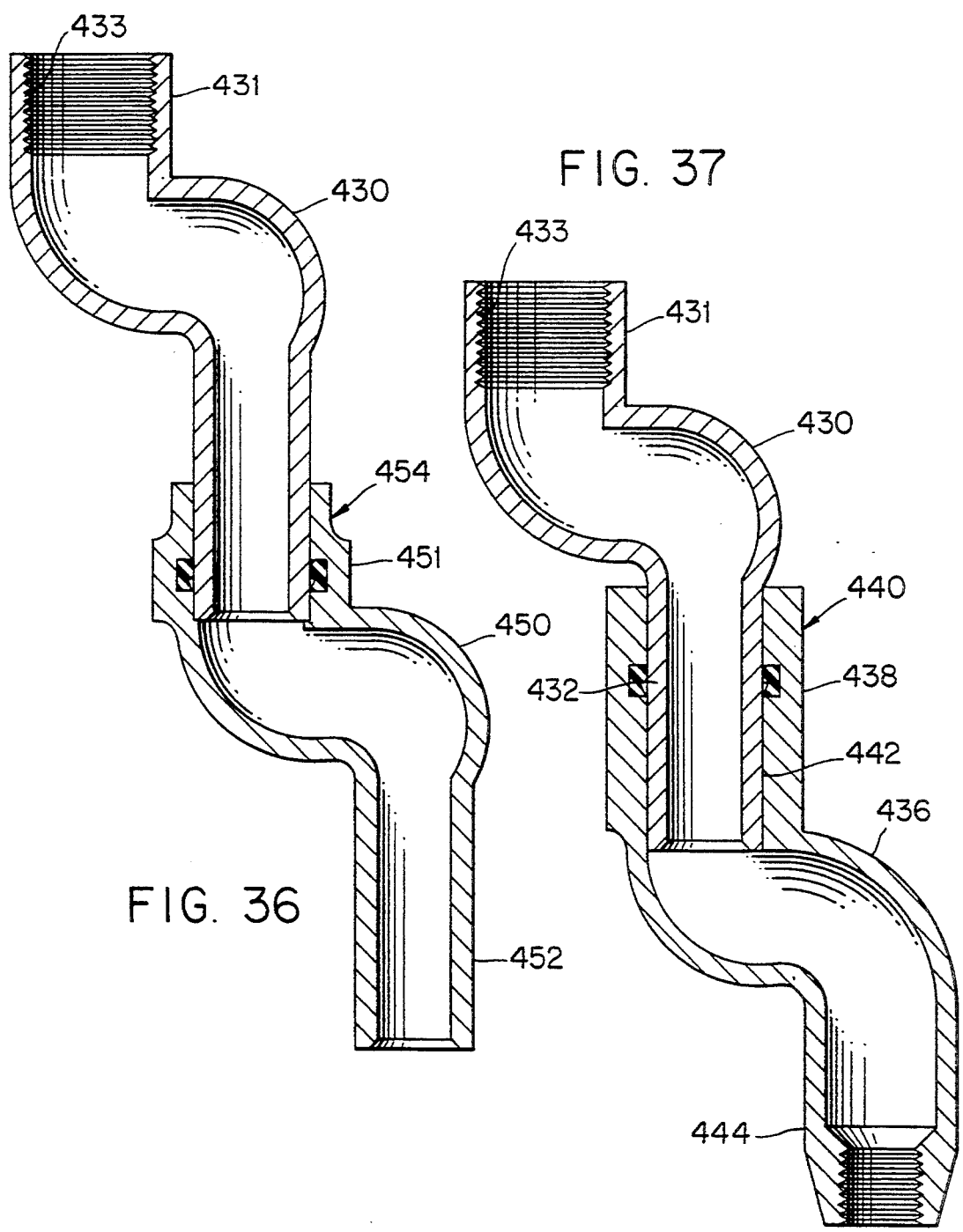

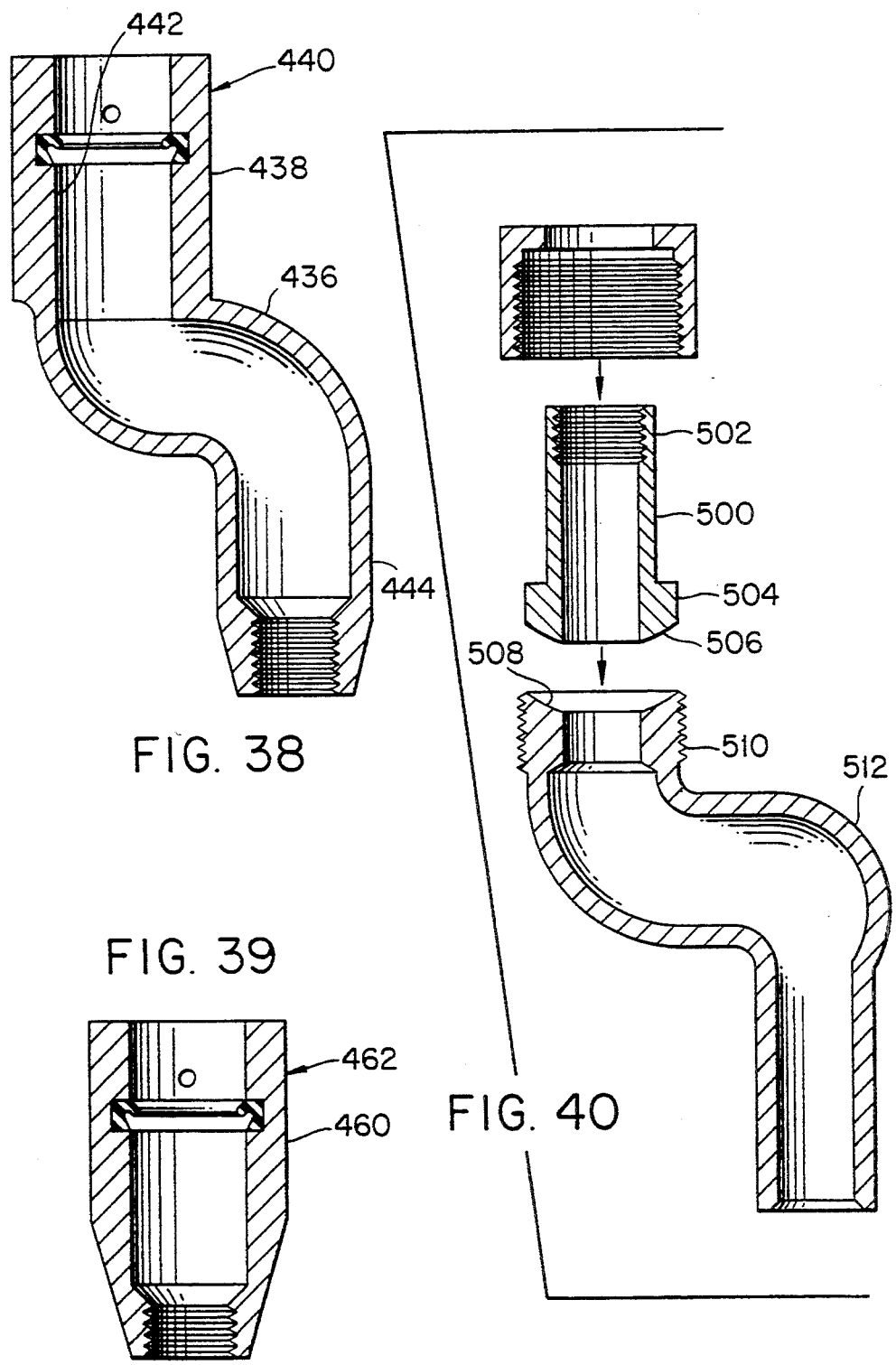

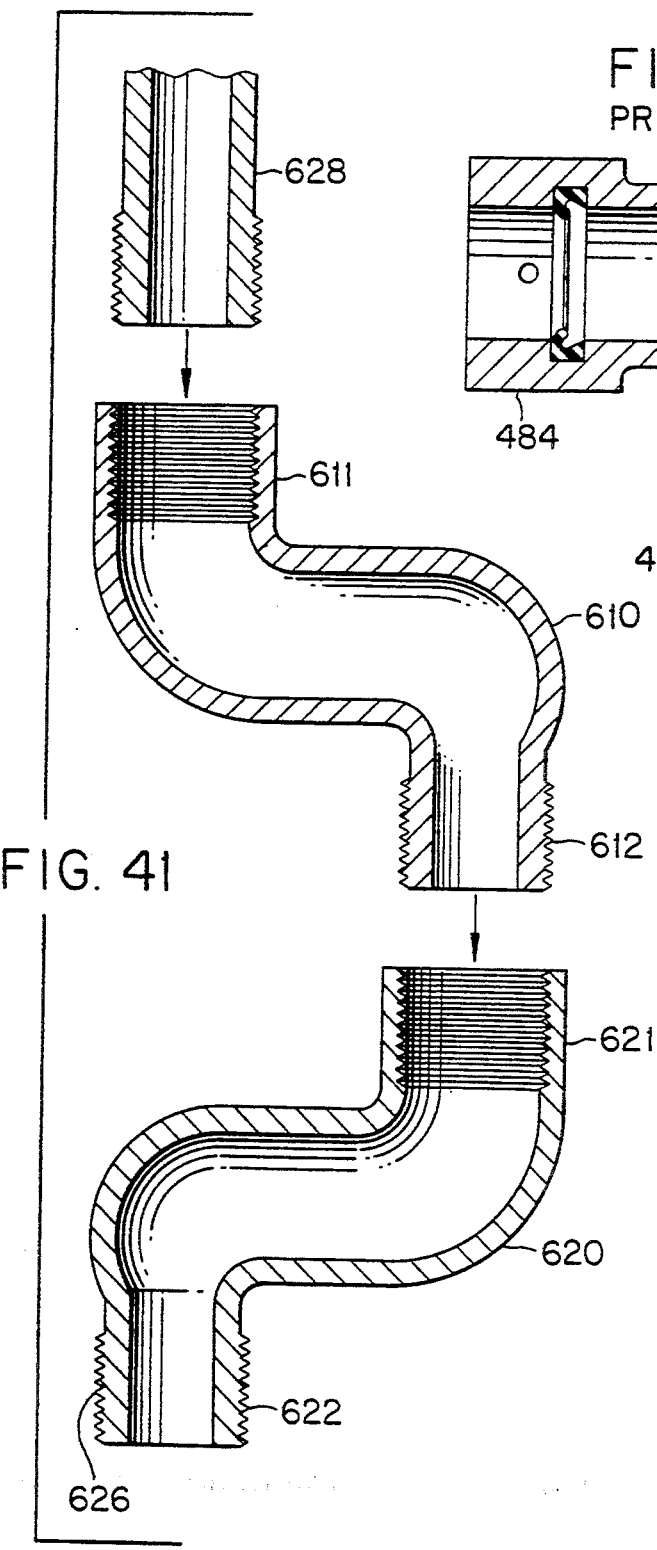
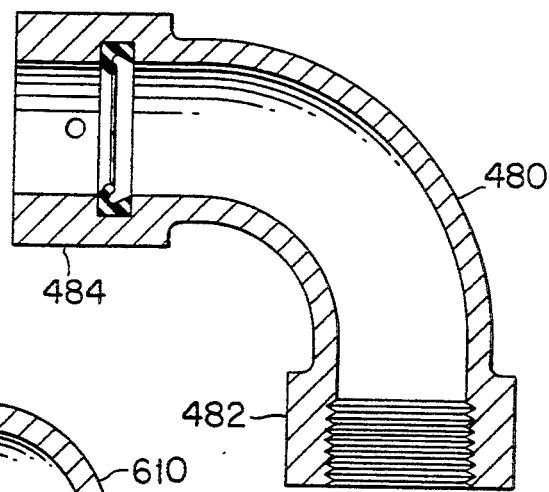
FIG. 42 PRIOR ART
FIG. 41

ADJUSTABLE SPRINKLER HEAD POSITIONING ASSEMBLY

BACKGROUND AND SUMMARY OF THE PRESENT INVENTION

This is a continuation-in-part of U.S. patent application Ser. No. 07/810,129 filed Dec. 19, 1991 which is a continuation-in-part of U.S. patent application Ser. No. 07/663,029 filed Mar. 1, 1991 which is a continuation-in-part of U.S. patent application Ser. No. 07/531,098 filed May 31, 1990 which, in turn, is a continuation-in-part of U.S. patent application Ser. No. 07/518,469, filed May 3, 1990, all now abandoned.

The present invention relates generally to plumbing fittings and assemblies especially for supporting a sprinkler head and more particularly to assemblies and various fittings for adjustably positioning a sprinkler head in a sprinkler system.

In the construction of new buildings as well as in the remodeling of existing buildings, a fire sprinkler system is typically installed or modified in a ceiling according to a predetermined design plan. However, due to unexpected changes during construction or remodeling, the miscalculation of distances during design, or merely the inability to accurately determine the final desired location of the sprinkler heads during the "rough-in" phase of construction, the fire sprinkler system drop lines in the ceiling may not be suitably located for providing correct location of the sprinkler heads.

Oftentimes, the locations of the drop lines are such that the sprinkler heads end up being located in odd locations in a room or being positioned off-center in a ceiling tile. Such inaccurate positioning can significantly detract from the intended or desired esthetics of the room. However, to achieve the required or desired positioning of the sprinkler heads, either repositioning or modification of the sprinkler drop lines or modification to the construction or remodeling design is required. Such measures often prove unduly expensive and time consuming, hence, it is desired to provide an apparatus that enables the correct positioning of sprinkler heads efficiently and inexpensively despite an inconvenient location of the sprinkler drop lines.

Several devices for positioning sprinkler heads are known which do not provide the versatility required to obtain a desired location of a sprinkler head in, for example, the center of a ceiling tile. For example, the device disclosed in U.S. Pat. No. 4,785,887 issued to Miller only provides for pivoting and vertical adjustment of a sprinkler head. The devices disclosed in U.S. Pat. No. 4,843,186 issued to Ballard and U.S. Pat. No. 4,071,266 issued to Mountford only provide for vertical adjustment of a sprinkler head. The device disclosed in U.S. Pat. No. 4,699,217 issued to McLennan et al. only provides for quick connect coupling at various predetermined locations along a drop line.

Another arrangement for positioning sprinkler heads is known from Riken Co., Ltd. as shown in a brochure entitled "Joints for Pipelines for Sprinkler Systems in Fire-Extinguishing Systems." In the Riken arrangement, however, bent pipe is used with the result that the minimum overall length for an arrangement having two offset conduits is calculated to be about 33.3 inches (for a one-inch inside diameter configuration) as compared with about 8.1 inches for two offset conduits according to the present invention (again for a one-inch inside diameter configuration). In other words, the Riken configuration is roughly four times as long as a comparable arrangement according to the present invention. Such a reduction in length becomes particularly significant in that the distance between the bottom of one floor and the top of an adjacent ceiling in United States construction is typically only about 12 to 16 inches. Therefore, an arrangement which can reduce the minimum total length of the sprinkler head positioning assembly is particularly important in that the reduction in length may enable the system to be used in situations where a longer system is unusable.

Also, it is particularly advantageous for the sprinkler head positioning system to be adjustable after rough installation, and especially to be adjustable without draining the sprinkler system of water. Typically the sprinkler system is "roughed-in" prior to the installation of the ceiling grid when a drop-tile ceiling is to be installed. The sprinkler system is installed based upon an expectation as to where the ceiling grid members will be positioned. After the electrical work, the heating and air conditioning and any other work which is to be installed above the ceiling is completed, the ceiling grids are installed. Then the sprinkler heads must be repositioned typically from one-eighth of an inch to usually no more than 6 inches in order to accurately position the sprinkler head at the center of the associated ceiling tile.

Accordingly, it is an object of the present invention to provide an adjustable sprinkler head positioning assembly which overcomes the problems associated with obtaining correct sprinkler head positioning.

Another object of the present invention is to provide an adjustable sprinkler head positioning system which is compact and which minimizes the overall length of the system.

Yet another object of the present invention is to provide an adjustable sprinkler head positioning assembly that is simple and easy to install and use and simple and easy to adjust after installation.

Still another object of the present invention is to provide an adjustable sprinkler head positioning assembly that is inexpensive.

A still further object of the present invention is to provide a positioning assembly that permits easy adjustment of a sprinkler head to a desired location after a ceiling grid is installed.

Another object of the present invention is to provide a drop line fitting that is easily securable to a sprinkler drop line and well suited to receive sprinkler system plumbing.

Another object of the present invention is to provide an elbow coupling member that is well suited to efficiently position a sprinkler head in a constricted space.

Another object of the present invention is to provide fittings and coupling members that augment the positioning capability of the positioning assembly.

These and other objects are accomplished by an adjustable sprinkler head positioning assembly and by fittings and elbow coupling members according to the present invention.

An adjustable fire-suppression sprinkler head positioning assembly according to the present invention comprises a first conduit having a first conduit inlet and a first conduit outlet with a center line of the first conduit outlet being offset from and parallel to a center line of the first conduit inlet. The first conduit inlet and the first conduit outlet are oriented to direct fluid flow in the same direction. The first conduit inlet and the first conduit outlet are substantially circular in cross section and the centerlines of the first conduit inlet and of the first conduit outlet are offset in the radial direction by a distance equal to at least the diameter of the first conduit inlet. The first conduit outlet has a smooth outer circumferential surface.

A second conduit has a second conduit inlet and a second conduit outlet with a center line of the second conduit outlet being offset from and parallel to a center line of the second conduit inlet. The second conduit inlet and the second conduit outlet are oriented to direct fluid flow in the same direction. The second conduit inlet and the second conduit outlet are substantially circular in cross section and the centerlines of the second conduit inlet and the second conduit outlet are offset in the radial direction by a distance equal to at least the diameter of the second conduit inlet.

The second conduit inlet comprises a socket which is integral with the second conduit. The smooth outer circumferential surface of the first conduit outlet is receivable within the socket. The socket has a set screw for securing the second conduit in a desired circumferential position relative to the first conduit. The socket further comprises sealing means for preventing fluid leakage between the first conduit outlet and the second conduit inlet.

A sprinkler head is received at the second conduit outlet. The first conduit is adjustably secured at the inlet of the first conduit to a sprinkler drop line which is disposed behind a surface from which a sprinkler head is intended to protrude. In this way, the sprinkler head may be variably positioned so as to be provided at a predetermined location along the surface from which a sprinkler head is intended to protrude.

An adjustable fire-suppression sprinkler head positioning assembly according to another embodiment of the present invention comprises a first conduit which has a first conduit inlet and a first conduit outlet. A center line of the first conduit outlet is offset from and parallel to a center line of the first conduit inlet. The first conduit inlet and the first conduit outlet are oriented to direct fluid flow in the same direction. The first conduit inlet and the first conduit outlet are substantially circular in cross section and the centerlines of the first conduit inlet and of the first conduit outlet are offset in the radial direction by a distance equal to at least the diameter of the first conduit inlet. The first conduit inlet comprises an integral socket provided with female threads and the first conduit outlet comprises male threads. The integral socket is provided with female threads adjustably securing the first conduit to a sprinkler drop line which is disposed behind a surface from which a sprinkler head is intended to protrude.

A second conduit has a second conduit inlet and a second conduit outlet with a center line of the second conduit outlet being offset from and parallel to a center line of the second conduit inlet. The second conduit inlet and the second conduit outlet are oriented to direct fluid flow in the same direction. The second conduit inlet and the second conduit outlet are substantially circular in cross section and the centerlines of the second conduit inlet and the second conduit outlet are offset in the radial direction by a distance equal to at least the diameter of the second conduit inlet.

The second conduit inlet comprises an integral socket provided with female threads. The male threads of the first conduit outlet are threadably receivable by the female threads of the integral socket of the second conduit inlet with the second conduit in a desired circumferential position relative to the first conduit while maintaining a fluid sealing relationship between the first conduit outlet and the second conduit inlet.

A sprinkler head is received at the second conduit outlet by male threads. The first conduit including the socket of the first conduit inlet and the male threads of the first conduit outlet are identical to the second conduit including the socket of the second conduit inlet and the male threads of the second conduit outlet. In this way, the same tooling forms both the first conduit and the second conduit and the sprinkler head may be variably positioned so as to be provided at a predetermined location along the surface from which a sprinkler head is intended to protrude.

An adjustable fire-suppression sprinkler head positioning assembly according to another embodiment of the present invention comprises a first conduit having a first conduit inlet and a first conduit outlet with a center line of the first conduit outlet being offset from and parallel to a center line of the first conduit inlet. The first conduit inlet and the first conduit outlet are oriented to direct fluid flow in the same direction. The first conduit inlet and the first conduit outlet are substantially circular in cross section and the centerlines of the first conduit inlet and of the first conduit outlet are offset in the radial direction by a distance equal to at least the diameter of the first conduit inlet. The first conduit inlet comprises an integral socket with a smooth outer circumferential surface of a fitting provided on a sprinkler drop line which is disposed behind a surface from which a sprinkler head is intended to protrude being receivable within the socket. The socket has a set screw for securing the first conduit in a desired circumferential position relative to the sprinkler drop line. The socket further comprises a seal which prevents fluid leakage between the first conduit inlet and the smooth outer circumferential surface of the fitting provided on the sprinkler drop line. The first conduit outlet has a smooth outer circumferential surface.

A second conduit has a second conduit inlet and a second conduit outlet with a center line of the second conduit outlet being offset from and parallel to a center line of the second conduit inlet. The second conduit inlet and the second conduit outlet are oriented to direct fluid flow in the same direction. The second conduit inlet and the second conduit outlet are substantially circular in cross section and the centerlines of the second conduit inlet and the second conduit outlet are offset in the radial direction by a distance equal to at least the diameter of the second conduit inlet. The second conduit inlet comprises an integral socket. The smooth outer circumferential surface of the first conduit outlet is receivable within the socket. The socket has a set screw for securing the second conduit in a desired circumferential position relative to the first conduit. The socket further comprises a seal for preventing fluid leakage between the first conduit outlet and the second conduit inlet.

A sprinkler head is received at the second conduit outlet by male threads provided on the second conduit outlet. The first conduit including the socket of the first conduit inlet and the smooth outer circumferential surface of the first conduit outlet is identical to the second conduit including the socket of the second conduit inlet and the second conduit outlet prior to receiving the male threads. In this way, the same tooling forms both the first conduit and the second conduit and the sprinkler head may be variably positioned so as to be provided at a predetermined location along the surface from which a sprinkler head is intended to protrude.

A drop line fitting for a sprinkler system according to the present invention comprises an inlet portion which is weldable to a sprinkler drop line such that the inlet portion is in fluid communication with the drop line when welded to the drop line. An outlet portion is generally in alignment with the inlet portion and in fluid communication with the drop line when the inlet portion is welded to the drop line. A socket is provided at the outlet portion for receiving a sprinkler system fitting. The socket includes a set screw for securing the sprinkler system fitting to the drop line fitting such that a fluid seal is formed between the sprinkler system fitting and the drop line fitting.

Another drop line fitting for a sprinkler system according to the present invention comprises an inlet portion releasably securable to a sprinkler pipeline such that the inlet portion is in fluid communication with the sprinkler pipeline when releasably secured to the pipeline. An outlet portion extends at an angle of 90° with respect to the inlet portion and is in fluid communication with the pipeline when the inlet portion is releasably secured to the pipeline.

A socket is provided at the outlet portion for receiving a sprinkler system fitting and includes a set screw for securing the sprinkler system fitting to the drop line fitting such that a fluid seal is formed between the sprinkler system fitting and the drop line fitting.

Another drop line fitting for a sprinkler system according to the present invention comprises an inlet portion which is releasably securable to a sprinkler pipeline such that the inlet portion is in fluid communication with the sprinkler pipeline when releasably secured to the pipeline. An outlet portion extends at 90° with respect to the inlet portion and is in fluid communication with the pipeline when the inlet portion is releasably secured to the pipeline. The outlet portion has a smooth outer circumferential surface for receipt within a socket of a sprinkler system fitting having a set screw for securing the sprinkler system fitting to the drop line fitting such that a fluid seal is formed between the sprinkler system fitting and the drop line fitting.

Another drop line fitting for a pipeline according to the present invention comprises an inlet portion which is releasably securable to a pipeline such that the inlet portion is in fluid communication with the pipeline when releasably secured to the pipeline. An outlet portion extends at 90° with respect to the inlet portion and is in fluid communication with the pipeline when the inlet portion is releasably secured to the pipeline. A socket is provided at the outlet portion for receiving a plumbing fitting and includes a set screw for securing the plumbing fitting to the drop line fitting such that a fluid seal is formed between the plumbing fitting and the drop line fitting.

Another drop line fitting for a pipeline according to the present invention comprises an inlet portion releasably securable to a pipeline such that the inlet portion is in fluid communication with the pipeline when releasably secured to the pipeline. An outlet portion extends at 90° with respect to the inlet portion and is in fluid communication with the pipeline when the inlet portion is releasably secured to the pipeline. The outlet portion has a smooth outer circumferential surface for receipt within a socket of a plumbing fitting having a set screw for securing the plumbing fitting to the drop line fitting such that a fluid seal is formed between the plumbing fitting and the drop line fitting.

A fitting for use in an adjustable fire-suppression sprinkler head positioning assembly according to the present invention comprises a conduit having an inlet and an outlet wherein a center line of the outlet is offset from and parallel to a center line of the inlet. The inlet and the outlet are oriented to direct fluid flow in the same direction. The inlet and the outlet are substantially circular in cross section and the centerlines of the inlet and of the outlet are offset in the radial direction by a distance equal to at least the diameter of the inlet. One of the inlet and the outlet comprises an integral socket whereby a smooth outer circumferential surface of another fitting is receivable within the socket. The socket has a set screw for securing the conduit in a desired circumferential position relative to the fitting. The socket further comprises a seal for preventing fluid leakage between the conduit and the fitting.

Another fitting for use in an adjustable fire-suppression sprinkler head positioning assembly according to the present invention comprises a conduit having an inlet and an outlet with a center line of the outlet being offset from and parallel to a center line of the inlet. The inlet and the outlet are oriented to direct fluid flow in the same direction. The inlet and the outlet are substantially circular in cross section and the centerlines of the inlet and of the outlet are offset in the radial direction by a distance equal to at least the diameter of the inlet. One of the inlet and the outlet comprises a smooth outer circumferential surface.

Another fitting for use in an adjustable fire-suppression sprinkler head positioning assembly according to the present invention comprises a conduit having an inlet and an outlet with a center line of the outlet being offset from and parallel to a center line of the inlet. The inlet and the outlet are oriented to direct fluid flow in the same direction. The inlet and the outlet are substantially circular in cross section and the centerlines of the inlet and of the outlet are offset in the radial direction by a distance equal to at least the diameter of the inlet. The inlet and the outlet are threaded.

An elbow fitting according to the present invention comprises a conduit having an inlet and an outlet. One of the inlet and the outlet comprises an integral socket whereby a smooth outer circumferential surface of another fitting is receivable within the socket. The socket has a set screw for securing the conduit in a desired circumferential position relative to the fitting. The socket further comprises a seal for preventing fluid leakage between the conduit and the fitting. The other of the inlet and the outlet comprises male threads.

Another elbow fitting according to the present invention comprises a conduit having an inlet and an outlet. One of the inlet and the outlet comprises an integral socket whereby a smooth outer circumferential surface of another fitting is receivable within the socket. The socket has a set screw for securing the conduit in a desired circumferential position relative to the fitting. The socket further comprises a seal for preventing fluid leakage between the conduit and the fitting. The other of the inlet and the outlet comprises a smooth outer circumferential surface.

Another elbow fitting according to the present invention comprises a conduit having an inlet and an outlet. One of the inlet and the outlet comprises a smooth outer circumferential surface. The other of the inlet and the outlet comprises female threads.

A fitting according to the present invention comprises a conduit having an inlet and an outlet. The inlet and the outlet are colinear with one of the inlet and the outlet comprising an integral socket. A smooth outer circumferential surface of another fitting is receivable within the socket. The socket has a set screw for securing the conduit to the fitting. The socket further comprises a seal for preventing fluid leakage between the conduit and the fitting. The other of the inlet and the outlet comprises female threads.

An adjustable fire-suppression sprinkler head positioning assembly system according to the present invention comprises an arrangement for connecting a sprinkler head to a supply conduit which enables the sprinkler head to be variably positioned after the sprinkler head is connected to the supply conduit so as to be provided at a predetermined location along a surface from which the sprinkler head is intended to protrude. The system comprises a plurality of plumbing fittings at least one of which comprises an inlet and an outlet which are not colinear. One of the inlet and the outlet of the at least one plumbing fitting comprises a smooth outer circumferential surface which may be received within a socket. The socket has a set screw for securing the fitting in a desired circumferential position relative to the socket. The socket further comprises a seal for preventing fluid leakage between the at least one plumbing fitting and the socket.

BRIEF DESCRIPTION OF THE DRAWINGS

Preferred embodiments of the present invention will be described in greater detail with reference to the accompanying drawings, wherein like members bear like reference numerals and wherein:

FIG. 1 is a cross-sectional view of an embodiment of the positioning assembly according to the present invention in a disassembled condition;

FIG. 2 is a cross-sectional view of a portion of the positioning assembly according to the present invention along the lines 2—2 of FIG. 1;

FIG. 6 is a cross-sectional view of another embodiment of the positioning assembly according to the present invention;

FIG. 7 is a cross-sectional view of one conduit of another embodiment of the positioning assembly according to the present invention;

FIG. 8 is a cross-sectional view of an elbow coupling useful in the positioning assembly according to the present invention;

FIG. 12 is a partial cross-sectional view of the positioning assembly according to the present invention as assembled in another arrangement;

FIG. 13 is a cross-sectional view of a segment of the positioning assembly according to the present invention along the lines 13—13 of FIG. 12;

FIG. 21 is a cross-sectional view of a conduit in accordance with an additional embodiment of the present invention;

FIG. 22 is a cross-sectional view of a conduit in accordance with an additional embodiment of the present invention;

FIG. 23 is a cross-sectional view of a conduit in accordance with an additional embodiment of the present invention;

FIG. 24 is a cross-sectional view of a conduit in accordance with an additional embodiment of the present invention;

FIG. 36 is a cross-sectional view of another embodiment of the positioning assembly according to the present invention;

FIG. 37 is a cross-sectional view of another embodiment of the positioning assembly according to the present invention;

FIG. 38 is a cross-sectional view of another conduit in accordance with an additional embodiment of the present invention;

FIG. 39 is a cross-sectional view of a conduit according to the present invention;

FIG. 40 is a cross-sectional view of another conduit in accordance with an additional embodiment of the present invention;

FIG. 41 is a cross-sectional view of another embodiment of the positioning assembly according to the present invention;

FIG. 42 is a cross-sectional view of an elbow according to the prior art useful in the arrangements of the present invention;

DETAILED DESCRIPTION OF THE PREFERRED EMBODIMENTS

With reference to FIGS. 1 and 2, a preferred embodiment of the adjustable sprinkler head positioning assembly according to the present invention includes a first conduit 10 which may be fabricated of black steel but is preferably fabricated of cast iron (such as 30,000 pound grey iron) and more preferably of cast ductile iron.

The use of ductile cast iron is especially preferable in the embodiments of the present invention having a socket and set screw connection because the use of ductile cast iron reduces the likelihood that the spigot (received in the socket) may crack as a result of overtightening of the set screw in the socket.

The first conduit as well as other fittings and conduits according to the present invention may be cast of plastic such as by injection molding provided that the use of such plastic is in compliance with all applicable codes and regulations relating to fire protection systems. In addition, the fittings and conduits according to the present invention may be fabricated from any material suitable for transporting water under pressure in compliance with the applicable fire codes and regulations.

The first conduit 10 includes an inlet portion 11 having a circular cross-section (as in pipe or tubing) and an outlet portion 12 having a circular cross-section. The first conduit 10 is fabricated to have a smooth and substantially constant area internal cross-section between the inlet portion 11 and the outlet portion 12 and the center line of the inlet portion 11 is parallel to, but offset from, the center line of the inlet portion 12 by a distance designated as $X_1$. In one embodiment of the present invention, the offsetting distance $X_1$ is at least as great as an inner diameter $D_1$ of the inlet portion 11.

Figure 11:
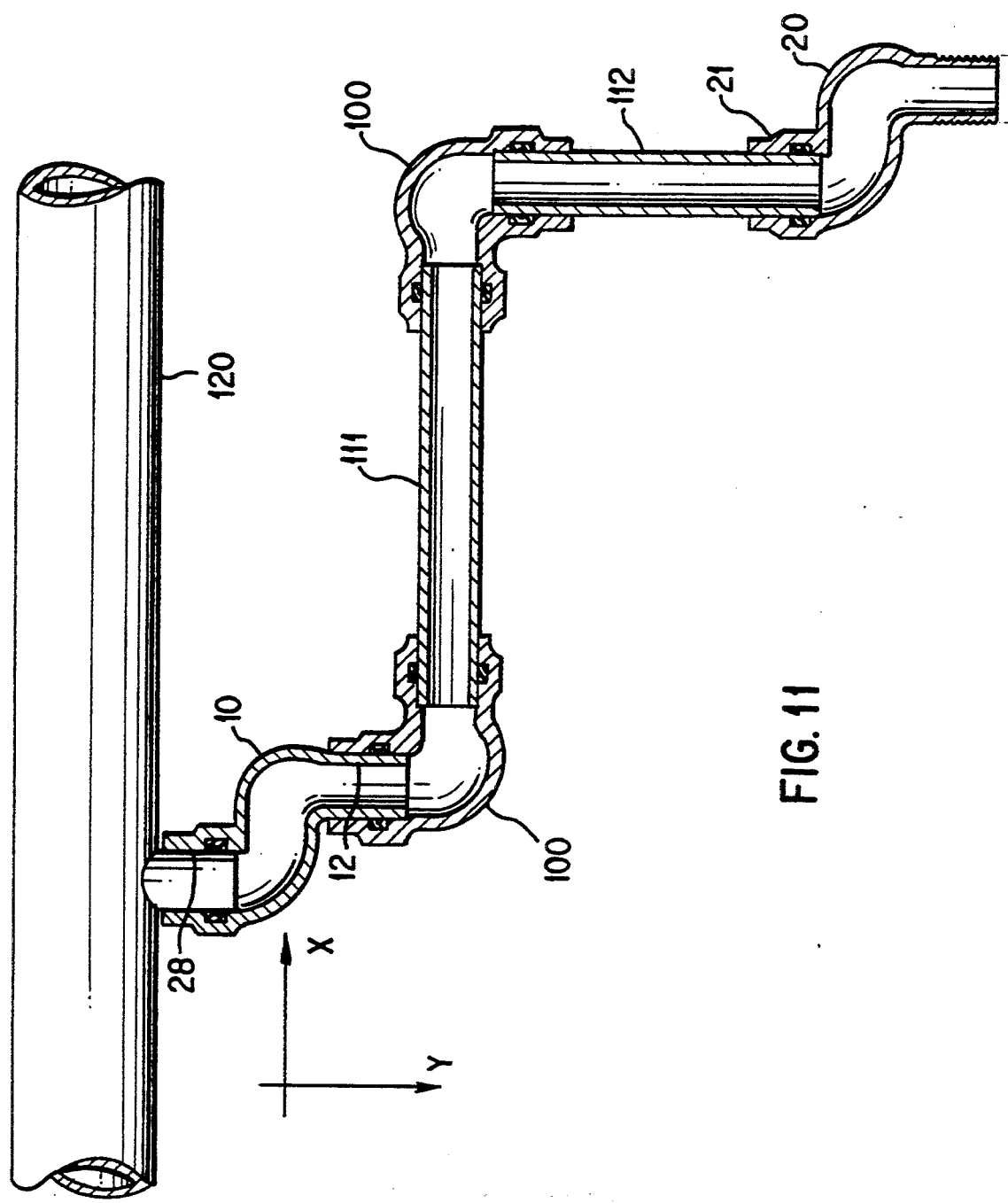
FIG. 11 is a partial cross-sectional view of the positioning assembly according to the present invention as assembled in one arrangement.

Included at the inlet portion 11 is an attachment arrangement for connecting the first conduit 10 to a sprinkler system drop line fitting. The attachment arrangement includes a set screw 13 along with a seal support collar 14 and a gasket or resilient seal 15. As shown in FIGS. 11 and 13, when the first conduit 10 is connected to a fitting 28 of a sprinkler system drop line (not shown), the fitting 28 is snugly positioned within the resilient seal 15. Additionally, the set screw 13 has been rotated so as to engage an external circumferential wall of the fitting 28 and to thus prevent movement of the first conduit relative to the sprinkler drop line fitting. The set screw may engage the fitting 28 at any peripheral location along the outer circumference of the fitting 28, hence, the first conduit 10 may be selectively secured to the fitting at any desired circumferential position relative to the drop line fitting 28.

The sprinkler head positioning assembly of the present invention also includes a second conduit 20 having an inlet portion 21 having a circular cross-section and an outlet portion 22 having a circular cross-section. The second conduit 20 is fabricated to have a smooth constant area internal cross-section between the inlet portion 21 and the outlet portion 22 and the center lines of both the inlet portion 21 and the outlet portion 22 are parallel to each other but offset by a distance designated as $X_2$. In one embodiment of the present invention, the distance designated as $X_2$ is at least as large as the inner diameter designated as $D_2$ of the inlet portion 21. The second conduit 20 may be of black steel but is preferably of cast iron pipe and more preferably of cast ductile iron but may be fabricated from any material suitable for transporting water under pressure in compliance with the applicable fire codes and regulations including being cast of plastic, for example, by injection molding.

As with the inlet portion 11 of the first conduit 10, the inlet portion 21 of the second conduit 20 also includes an attachment arrangement. However, the attachment arrangement in the second conduit 20 is used for connecting the second conduit 20 to the first conduit 10 and not for connecting the second conduit 20 to a drop line fitting. In particular, the inlet portion 21 of the second conduit 20 is configured to receive the outlet portion 12 of the first conduit 10. In similarity with the attachment arrangement of the first conduit 10, the attachment arrangement of the second conduit 20 includes a set screw 23 along with a seal support collar 24 and a gasket or resilient seal 25 which is received within an annular groove in the seal support collar 24.

On the outlet portion 22 of the second conduit 20 are disposed external threads 26. The external threads 26 are suitable for receiving a sprinkler head. To enable use of the assembly for certain sprinkler heads, the outlet portion 22 may be fabricated with internal threads instead. In the assembled condition, the outlet portion 12 of the first conduit 10 is received within the inlet portion 21 of the second conduit 20. More specifically, the outlet portion 12 is positioned such that snug, liquid tight contact exists between the outlet portion 12 and the resilient seal 25 of the inlet portion 21. The set screw 23 engages the smooth external circumferential wall of the outlet portion 12 and thus prevents movement of the second conduit 20 relative to the first conduit 10. If desired, the smooth external wall of the outlet portion 12 may be provided with a slight taper to facilitate insertion of the outlet portion or spigot into the socket 24. The set screw 23 may engage the outlet portion 12 at any peripheral location along the outer circumference of the outlet portion 12, hence, the second conduit 20 may be selectively secured to the first conduit 10 at any desired circumferential position relative to the first conduit 10.

In the assembled state, the adjustable sprinkler head positioning assembly also includes a sprinkler head 27 that is received in the outlet portion 22 of the second conduit 20. Specifically, the sprinkler head 27 has internal threads that engage the external threads 26 of the outlet portion 22 of the second conduit 20. In order to prevent leakage between the sprinkler head 27 and the outlet portion 22, the sprinkler head 27 must be sufficiently threaded onto the outlet portion 22, so as to form a fluid tight seal between the sprinkler head 27 and the outlet portion 22.

During the construction and assembly of a fire sprinkler system in a building, the present invention is advantageously utilized to obtain a desired position of the sprinkler head. In particular, as shown in FIG. 3 the present invention is especially useful for orienting a sprinkler head 27 into a center location of a ceiling tile 30 despite the off-center orientation of the sprinkler drop line 31.

Figure 3:
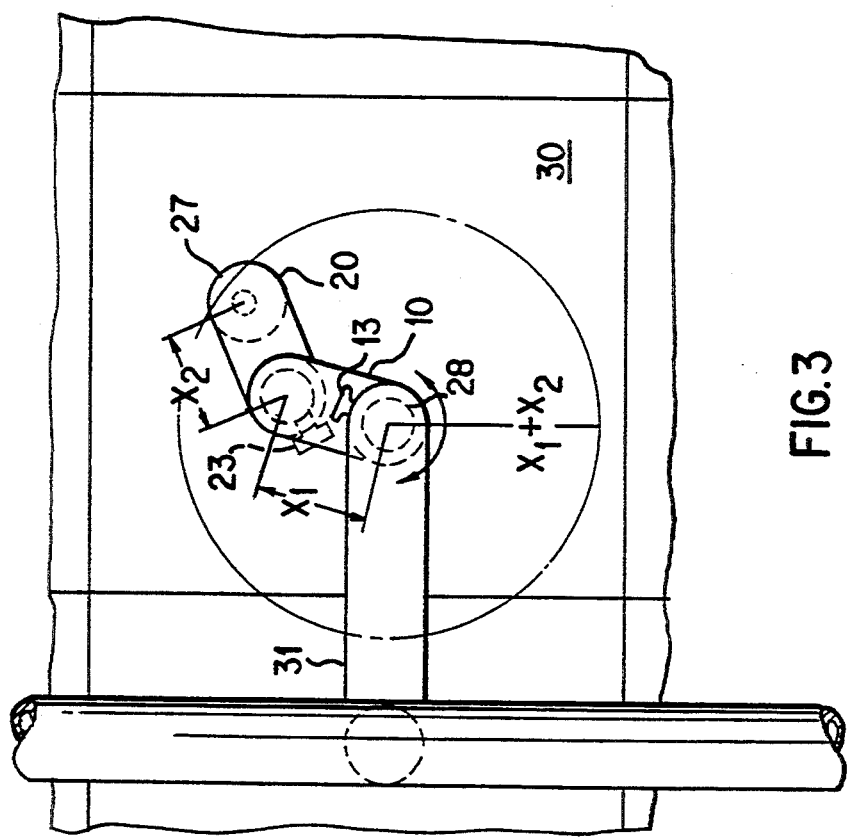
FIG. 3 is a top view of the positioning assembly according to the present invention as mounted for use.

Referring to both FIGS. 1 and 3, a desired position of the sprinkler head 27 is achieved by first connecting the first conduit 10 to the fitting 28 of the sprinkler drop line 31. So as to allow easy adjustment of the circumferential position of the first conduit 10 relative to the fitting 28, the set screw 13 undergoes only hand-tightened engagement with the outer wall of the fitting 28. Then, the outlet portion 12 of the first conduit 10 is received by the inlet portion 21 of the second conduit 20 so as to connect the second conduit 20 to the first conduit 10. Again, so as to allow easy adjustment of the circumferential positioning, the set screw 23 undergoes only hand-tightened engagement with the outer wall of the outlet portion 12 of the first conduit 10.

After the first and second conduits 10, 20 have been assembled to the fitting 28, a sprinkler head 27 may at this time be inserted into the outlet portion 22 of the second conduit 20. However, to ease construction, the sprinkler head 27 may be mounted on the second conduit 20 prior to connecting the second conduit 20 to the first conduit 10. Yet further, mounting of the sprinkler head may be delayed until final positioning of the conduits is achieved.

As the set screws 13 and 23 are only hand tightened, the first conduit 10 may be adjustably rotated around the fitting 28 and the second conduit 20 may be adjustably rotated around the outlet portion 12 of the first conduit 10. That is, the first and second conduits 10, 20 may be adjustably rotated according to the arrows in FIG. 3. Since the inlet and outlet portions of each conduit 10, 20 are respectively offset by the distances $X_1$ and $X_2$ (see FIG. 1), the rotation of each conduit enables the sprinkler head 27 to be positioned anywhere within a circle having a radius equal to the sum of the offsetting distances $X_1$, $X_2$. Consequently, through rotational adjustment of the conduits 10, 20, a desired location of the sprinkler head 27 may be achieved as shown in FIG. 3. More specifically, a sprinkler head 27 may be positioned in the center of a ceiling tile 30 despite the off-centered location of the sprinkler drop line 31.

Once the desired position of the sprinkler head 27 is obtained, the set screws 13 and 23 are tightened to a sufficient degree so as to ensure a liquid tight seal at the fitting 28 and at the outlet portion 12 of the first conduit 10.

Preferably, the first and second conduits have a one inch internal diameter and the first conduit 10 has a length of just over 5 inches with the distance $X_1$ being 3 inches. The second conduit 20 likewise has a length of just over 5 inches and the distance $X_2$ is again 3 inches. Therefore the overall length of the first and second conduits (when connected to one another) is less than 10 inches for a one inch internal diameter configuration because of the engagement of the first outlet in the second inlet but the arrangement enables the sprinkler to be positioned anywhere within a circle having a 12 inch diameter.

As shown in FIG. 1, the overall length of the first conduit is about 6 times the cross sectional diameter of the minimum passageway through the conduit. Therefore, if the minimum passageway is one inch, the overall length of the first conduit is about 6 inches. With reference to FIG. 6, because of the insertion of the outlet of the first conduit into the inlet of the second conduit, the overall length of the combined first and second conduits is less than 10 times the cross sectional diameter of the minimum passageway. In other words, if the minimum internal diameter is one inch, the overall length of the preferred embodiment is less than 10 inches when the first and second conduits are combined together.

Figure 4:
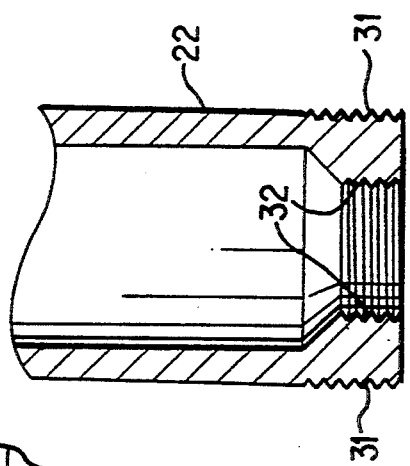
FIG. 4 is a partial cross-sectional view of the second conduit of FIG. 1 in accordance with another embodiment of the present invention.

With reference now to FIG. 4, according to a second embodiment of the sprinkler head positioning assembly of the present invention, the outlet portion 22 of the second conduit 20 is configured so as to have external threads 31 and internal threads 32. An outlet portion 22 so configured is adapted to receive a sprinkler head assembly that incorporates a vertical adjustment feature. For example, the embodiment of FIG. 4 is suited to receive a vertically adjustable wet drop nipple such as that disclosed in a publication of Allied Piping Products Company, Inc. for a Model 300 and a Model 125 Wet Drop Nipple. An assembly in accordance with the present invention having an outlet portion configuration of FIG. 4 thus is capable of adjusting the position of a sprinkler head 27 both horizontally through the rotational adjustment of first and second conduits 10, 20 and vertically through the adjustment of a wet drop nipple.

Figure 5:
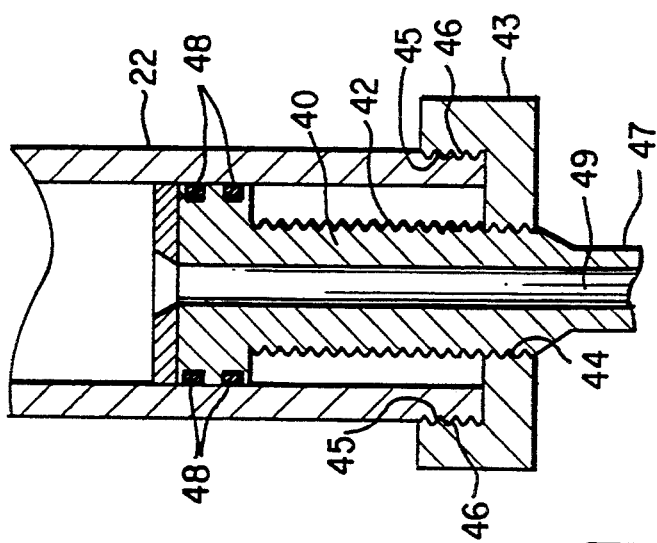
FIG. 5 is a partial cross-sectional view of the second conduit of FIG. 1 in accordance with another embodiment of the present invention.

According to a third embodiment of the sprinkler head positioning assembly of the present invention, with reference now to FIG. 5, the outlet portion 22 of the second conduit 20 includes an outlet cylinder 47 inserted into the outlet portion 22 and secured therein by commonly known O-ring seals 48. The bottom portion of the outlet cylinder 47 is configured to receive a sprinkler head inlet. A fluid passageway 49 extends through the entire length of the cylinder 47.

The outlet cylinder 47 is further secured to the outlet portion 22 of the second conduit 20 by an outside collar 43. The outside collar 43 includes two sets of internal threads 44, 46. The first set of internal threads 44 engage external threads 42 on the outlet cylinder 47. The second set of internal threads 46 engage the external threads 45 of the outlet portion 22 of the second conduit 20.

When the outlet cylinder 47 is secured to the outlet portion 22, with reference to FIG. 5, the vertical position of the outlet cylinder 47 may be adjusted by rotating the cylinder 47 relative to the collar 43. By rotating the cylinder 47, a sprinkler head outlet attached to a bottom portion of the cylinder 47 is vertically adjusted due to the engagement of internal threads 44 with external threads 42. However, a fluid seal is maintained between the outlet cylinder 47 and the outlet portion 22 during vertical adjustment due to the presence of the O-rings 48. As with the second embodiment of FIG. 4, the third embodiment of FIG. 5 provides a sprinkler head positioning assembly that adjusts a sprinkler head both horizontally and vertically such that a desired position of the sprinkler head is achieved.

According to a fourth embodiment of the sprinkler head positioning assembly of the present invention as shown in FIG. 6, the outlet portion 22 of the second conduit 20 is formed to have a smooth circumferential outer surface. That is, instead of the outlet portion 22 having external threads 26 as in the first embodiment (see FIG. 1), the outlet portion 22 has an outer circumferential surface that is smooth. Consequently, the second conduit 20 is configured the same as the first conduit 10 and the two conduits then become interchangeable. As a result, manufacturing costs are reduced since the same tooling may be used to form both the first and second conduits of the a sprinkler head assembly positioning assembly of the present invention. For the fourth embodiment of the present invention, a conventional sprinkler head for mounting on a smooth outer circumferential surface of the outlet portion 22 of the second conduit 20 may be utilized e.g. same product.

According to a fifth embodiment of the adjustable sprinkler head positioning assembly of the present invention as shown in FIG. 7, a conduit 70 is provided that may serve as both the first and second conduit of the adjustable assembly of the present invention. The conduit 70 includes an inlet portion 71 and an outlet portion 72 wherein both inlet portion 71 and the outlet portion 72 have a smooth outer circumferential surface. The conduit member 70 of the fifth embodiment must be utilized with intervening coupling members in order to appropriately assemble the positioning assembly of the present invention. Numerous types of previously known coupling members may be used.

Figure 17:
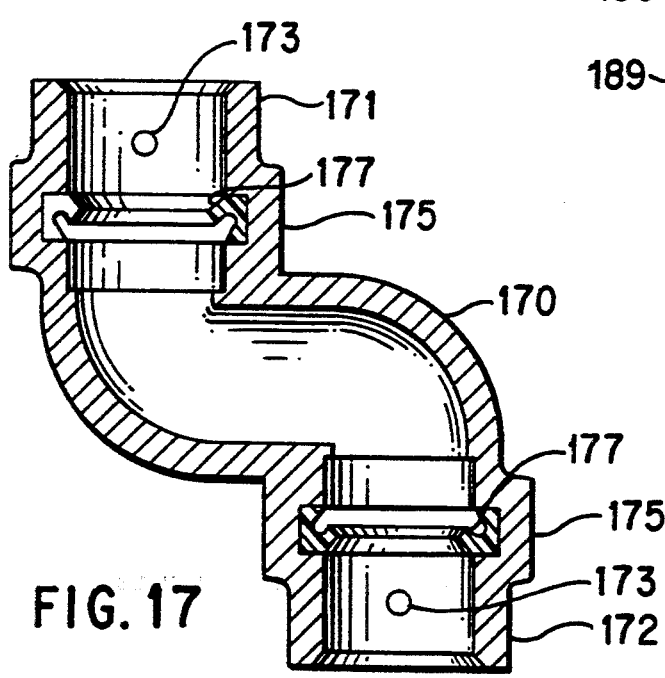
FIG. 17 is a cross-sectional view of another embodiment of the positioning assembly according to the present invention.

A sixth embodiment of the adjustable sprinkler head positioning assembly of the present invention as shown in FIG. 17 includes a conduit 170 that may be used in combination with conduits of previously described embodiments or may serve as both the first and second conduit of the adjustable assembly of the present invention in a manner similar to that of the fifth embodiment.

The conduit 170 includes an inlet portion 171 and an outlet portion 172 wherein both portions are configured with an attachment arrangement such as that utilized on the inlet portion of the conduit 10 depicted in FIG. 1. The attachment arrangement, or socket, at both the inlet portion 171 and outlet portion 172 includes a set screw 173 along with a seal support collar 174 and a resilient seal 175. For example, when serving as both first and second conduits, the first conduit may be connected to the second conduit by means of a smooth pipe.

When the conduit member 170 of the sixth embodiment is utilized as both the first and second conduit, an intervening connecting member (not shown) such as a smooth extension pipe is used to connect the first and second conduit members. The intervening connecting member is receivable into the outlet portion attachment arrangement of the first conduit as well as into the inlet portion attachment arrangement of the second conduit. Further, a sprinkler head assembly is used that is receivable into the attachment arrangement of the outlet portion of the second conduit.

Additional embodiments of the adjustable sprinkler head positioning assembly of the present invention are shown in FIGS. 21-24. In each of FIGS. 21-24, a conduit is shown that may be used either in combination with the conduits of other embodiments described herein or may serve as both the first and second conduit of the adjustable assembly of the present invention in a manner similar to that described with respect to the fifth embodiment.

Referring to FIG. 21, a conduit 210 includes an inlet portion 211 and an outlet portion 212. The outlet portion 212 is configured with an attachment arrangement such as that utilized on the inlet portion of the conduit 10 depicted in FIG. 1. The attachment arrangement, or socket, at the outlet portion 212 includes a set screw 213 along with a seal 215 seated in a seal support collar 214. The inlet portion 211 is configured to include internal threads 216.

If desired, the inlet and outlet portions of the conduit 210 could be reversed with the socket 214 forming the inlet and the female threaded portion 211 forming the outlet of the conduit.

Referring to FIG. 22, a conduit 220 includes an inlet portion 221 and an outlet portion 222. The outlet portion 222 has a smooth outer circumferential surface and the inlet portion 221 includes external threads 223.

Referring to FIG. 23, a conduit 230 includes an outlet portion 232 and an inlet portion 231. The outlet portion 232 is configured to have a smooth outer circumferential surface and the inlet portion 231 is configured with internal threads 233.

Referring to FIG. 24, a conduit 240 includes an inlet portion 241 and an outlet portion 242. The inlet portion 241 is configured to have external threads 244 and the outlet portion 242 is configured to have internal threads 243.

Figure 26:
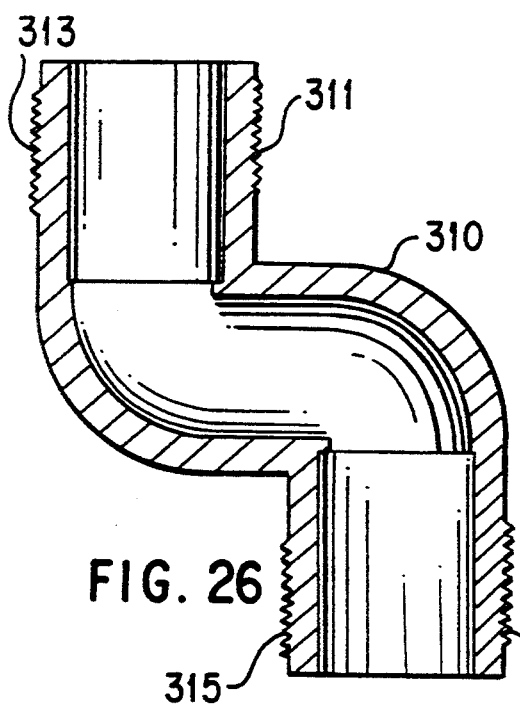
FIG. 26 is a cross-sectional view of a conduit in accordance with an additional embodiment of the present invention.

Referring to FIG. 26, a conduit 310 includes an outlet portion 315 and an inlet portion 311. Both the outlet portion 315 and the inlet portion 311 are configured to have external threads 313, 314, respectfully.

Figure 27:
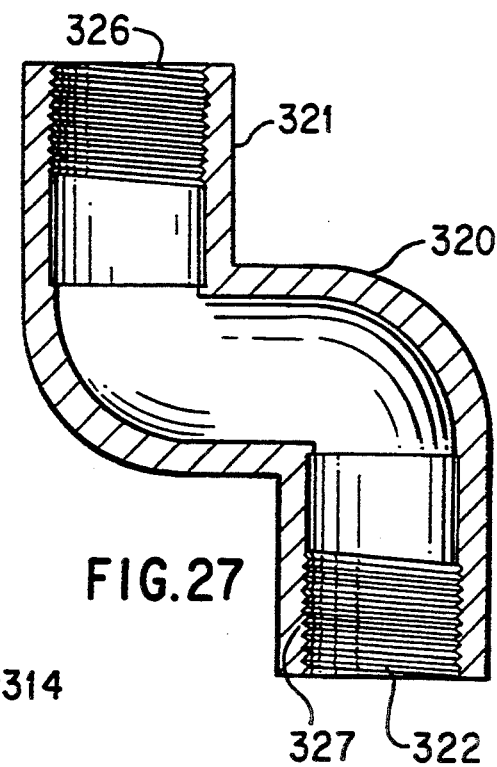
FIG. 27 is a cross-sectional view of a conduit in accordance with an additional embodiment of the present invention.

Referring to FIG. 27, a conduit 320 includes an inlet portion 321 and an outlet portion 327. Both the inlet portion 321 and the outlet portion 327 are configured to have internal threads 326, 322, respectfully.

Vertical adjustment assemblies may be envisioned for use with any of the disclosed embodiments of the adjustable sprinkler head positioning assembly of the present invention. For example, a first vertical adjustment assembly as shown in FIG. 14 or a second vertical adjustment assembly as shown in FIG. 15 may be utilized at least in the first embodiment of the adjustable sprinkler head positioning assembly of the present invention.

Figure 14:
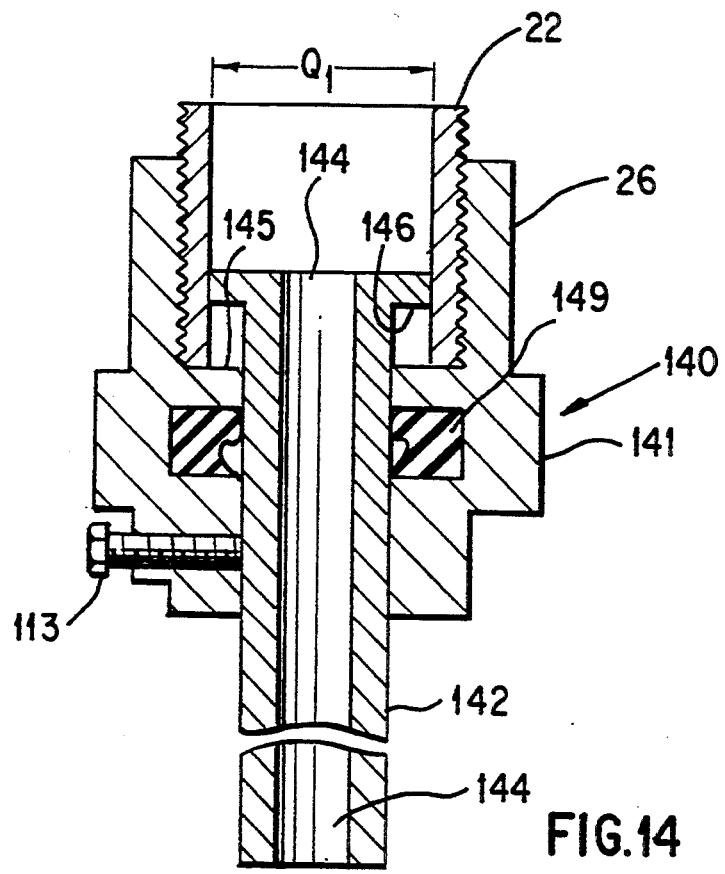
FIG. 14 is a cross-sectional view of a vertical adjustment assembly for use in the positioning assembly according to the present invention.

Referring to FIG. 14, the outlet portion 22 of the second conduit 20 of the first embodiment is threadably engaged via threads 26 in a first vertical adjustment assembly 140. The vertical adjustment assembly 140 includes a collar 141 that houses a seal 149 and a set screw 143. The vertical adjustment assembly 140 also includes a vertical adjustment tube 142 which is formed to have a top flange portion 146 and a passageway 144 extending the length of the tube 142. The diameter of the flange 146 is less than the inner diameter $Q_1$ of the outlet portion 22 of the second conduit 20. Preferably, the diameter of the flange 146 is at least 0.010 inches less than the inner diameter $Q_1$. The tube 142 at a lower end is adapted to receive a sprinkler head.

Since the diameter of the flange 146 is less than the inner diameter of the outlet portion 22, the tube 142 is vertically adjustable within the outlet portion 22 of the second conduit 20. In a furthermost extended position of the tube 142, the flange 146 abuts a land 145 on the adjustment collar 141. During use, the tube 142 will be vertically oriented so that a sprinkler head may be attached at a desirable vertical location. The set screw 143 will then be urged against the tube 142 to secure the tube 142 in the proper position. Leakage is prevented by the seal 144.

Figure 15:
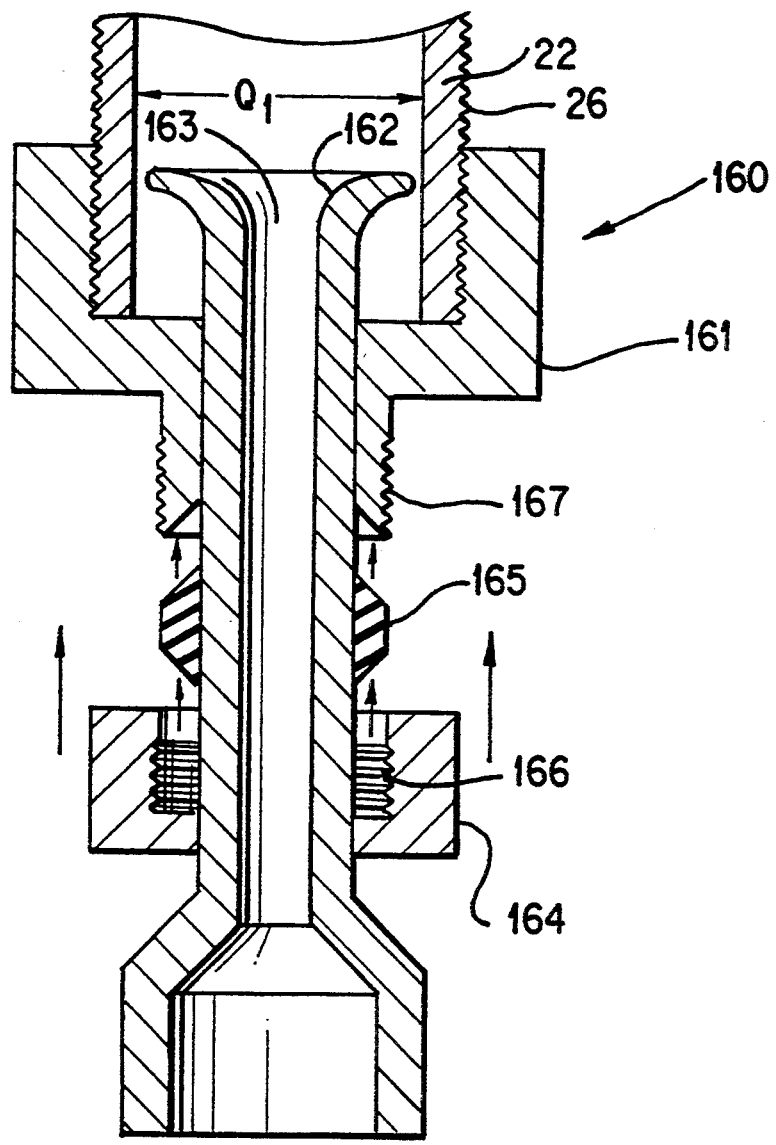
FIG. 15 is a cross-sectional view of another vertical adjustment assembly for use in the positioning assembly according to the present invention.

A second vertical adjustment assembly 160 may also be used with at least the first embodiment of the present invention as shown in FIG. 15. Specifically, the outlet portion 22 of the second conduit 20 is received in a collar 161 via threads 26. The collar 161 includes a threaded portion 167 for receiving a compression fitting comprising a fitting 165 along with compression collar 164. The compression fitting serves to secure an adjustment tube 162 at a desired vertical location while also providing a fluid seal. The tube 162 is flared at a top end wherein a diameter of the flare is less than the inner diameter $Q_1$ of the outlet portion 22 of the second conduit 20. Preferably, the diameter of the flare is 0.010 inches less than the inner diameter $Q_1$. A lower end of the tube 162 is configured to receive a sprinkler head.

During use, the tube 162 will be moved to a vertical position according to a desired location of the sprinkler head. Then the compression collar 164 will be threadably secured to the threaded portion 167 of the collar 161. As the compression collar 164 is threaded, the fitting 165 is deformed to compress around the outer circumference of a tube 162 such that tube 162 is secured in the desired vertical position. In addition, the fitting 165 is compressed to prevent any fluid leakage between the fitting 165 and the outer surface of the tube 162.

Figure 16:
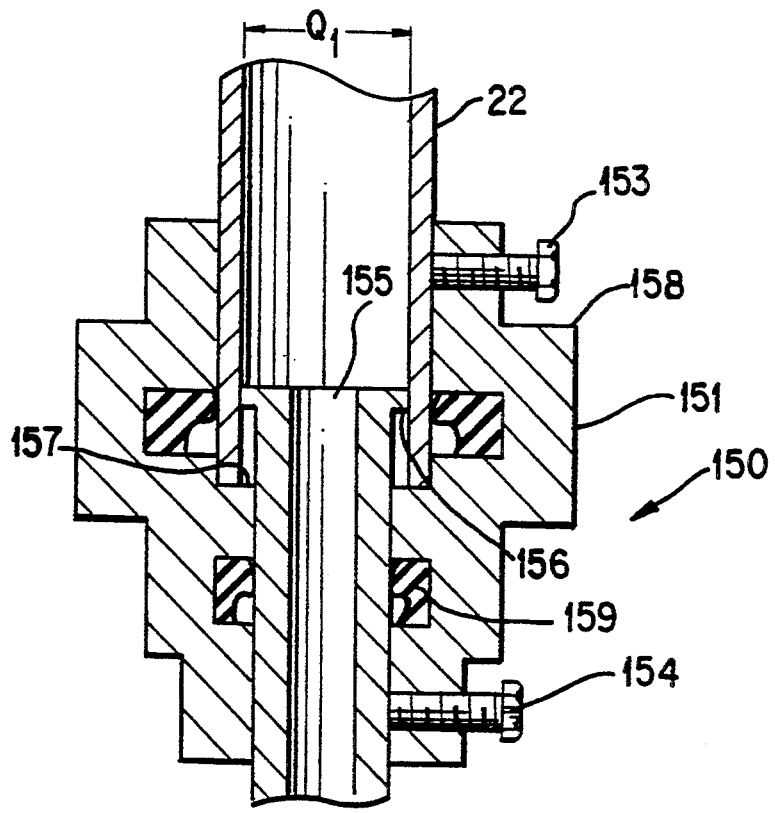
FIG. 16 is a cross-sectional view of another vertical adjustment assembly for use in the positioning assembly according to the present invention.

A third vertical adjustment assembly 150 may be utilized with at least the fourth and fifth embodiments of the adjustable sprinkler head positioning assembly of the present invention. Referring to FIG. 16, the smooth outer circumferential surface of the outlet portion 22 of the second conduit 20 is received in a collar 151. The outlet portion 22 is secured in the collar 151 by a set screw 153. In addition, the outlet portion 22 is surrounded by a seal 158 which is housed in the collar 151.

The lower structure of the third vertical adjustment assembly 150 is substantially the same as the first vertical adjustment assembly 140 (see FIG. 14). That is, the vertical adjustment assembly 150 includes an adjustable tube 152 having a flange 156 and a passageway 155. The flange 156 has a diameter that is less than the inner diameter $Q_1$ of the outlet portion 22 such that the tube 152 is freely movable in a vertical direction within the outlet portion 22. Preferably, the diameter of the flange 156 is 0.010 inches less than the inner diameter $Q_1$. The tube 152 is secured at a desired vertical location by tightening of the set screw 154. In addition, a seal 159 prevents fluid leakage around the tube 152. In an extended position of the tube 152, the flange 156 abuts a land 157 of the collar 151.

With any of the three vertical adjustment assemblies 141, 150, 160, the tube that is vertically adjustable within each assembly may be fabricated of any desirable length. Typically, however, the length of such tubes ranges between 3½ inches to 5 inches long. The disclosed vertical adjustment assemblies are especially useful when adjustments within the range of 0 to around 2½ inches are necessary. Adjustments within this range are often necessary when a series of sprinkler heads are mounted along the length of one drop line since such drop lines are usually mounted at an incline to allow gravity drainage if desired. Typically, sprinkler drop lines are oriented such that there is a ⅛ inch vertical drop for every 10 feet of line.

In certain situations wherein the sprinkler head positioning assembly of the present invention is utilized, it is often advantageous or necessary to use an elbow coupling member along with extension pipes in order to expand the usefulness of the assembly. Examples of the use of such elbow couplings and extension pipes are depicted in FIGS. 11 and 12. Depending on which embodiment of the present invention is being utilized in any particular situation, however, different elbow couplings may be required.

For example, in certain circumstances, an elbow coupling 80 as shown in FIG. 8 may be utilized. Elbow coupling 80 includes an inlet portion 81 that is substantially the same as the inlet portion 11 of the first conduit member 10 of the first embodiment of the present invention (see FIG. 1). That is, the first inlet portion 81 includes a seal support collar 84 for a circumferential seal 85 along with a set screw 83 for securing the received member. The elbow coupling 80 also includes an outlet portion 82 that is substantially the same as the outlet portion 22 of the second conduit member 20 of the first embodiment of the present invention (see FIG. 1). That is, the outlet portion 82 includes external threads 86.

Figure 9:
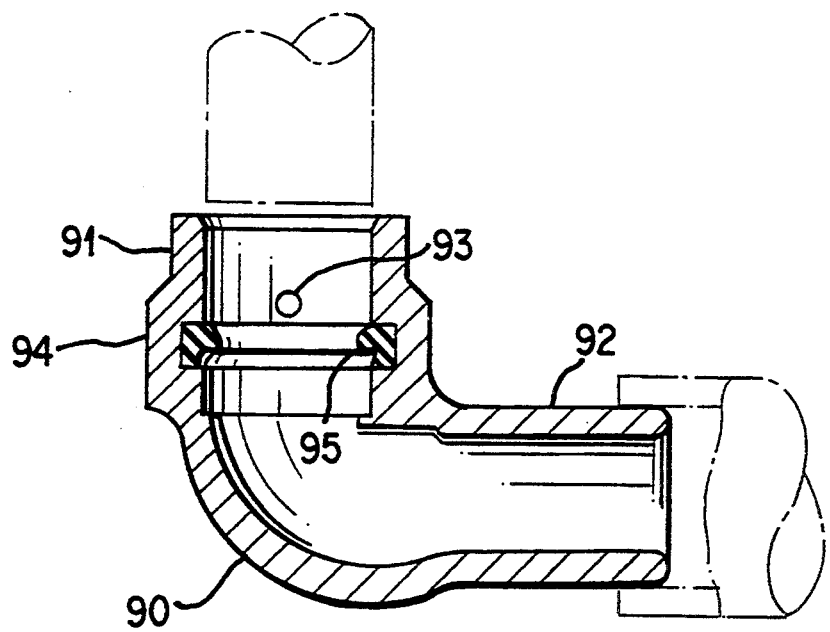
FIG. 9 is a cross-sectional view of another elbow coupling useful in the positioning assembly according to the present invention.

Another example of an acceptable elbow coupling is an elbow coupling 90 as shown in FIG. 9. The elbow coupling 90 includes an inlet portion 91 that is substantially the same as the inlet portion 81 of the elbow coupling 80 (see FIG. 8). The inlet portion 91 includes a seal support collar 94 along with a seal 95 and a set screw 93. The elbow coupling 90 also includes an outlet portion 92 that is substantially the same as the outlet portion 22 of the second conduit member 20 of a fourth embodiment of the present invention (see FIG. 6). That is, the outlet portion 92 has a smooth outer circumferential surface.

The elbow coupling 90 provides both lateral adjustability as well as vertical adjustability and may also be adjusted about 360° after installation while still providing a leak-tight connection.

Figure 28:
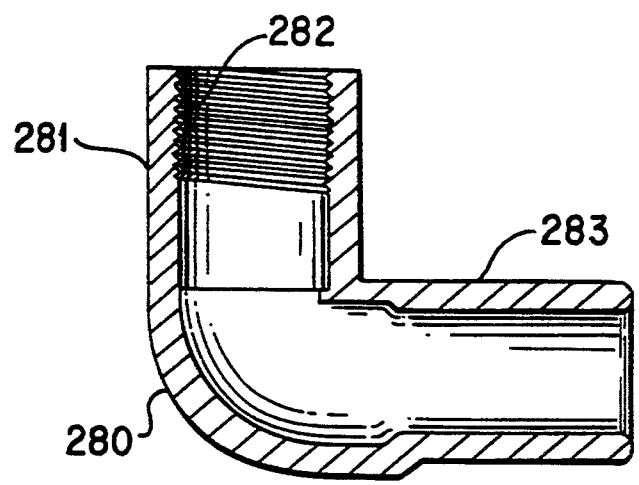
FIG. 28 is a cross-sectional view of another elbow coupling useful in the positioning assembly according to the present invention.

Another example of an acceptable elbow coupling is elbow coupling 280 as shown in FIG. 28. The elbow coupling 280 includes an inlet portion 281 having internal threads 282. The elbow coupling also includes an outlet portion 283 that is substantially the same as outlet portion 22 of the second conduit member 20 of a fourth embodiment of the present invention (see FIG. 6). That is, the outlet portion 283 has a smooth outer circumferential surface.

Figure 10:
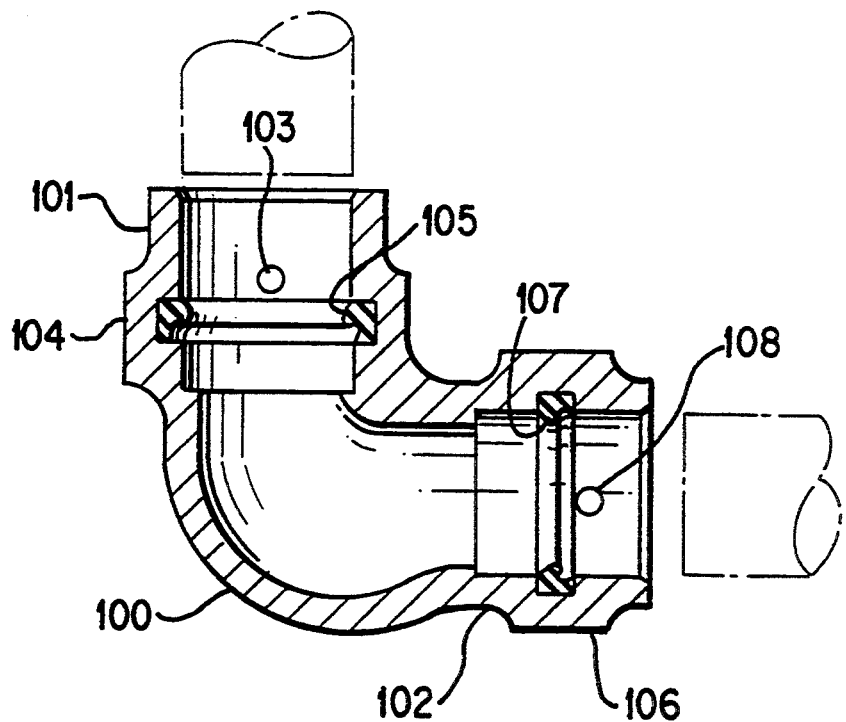
FIG. 10 is a cross-sectional view of an elbow coupling according to the prior art which is useful in the positioning assembly according to the present invention.
Figure 19:
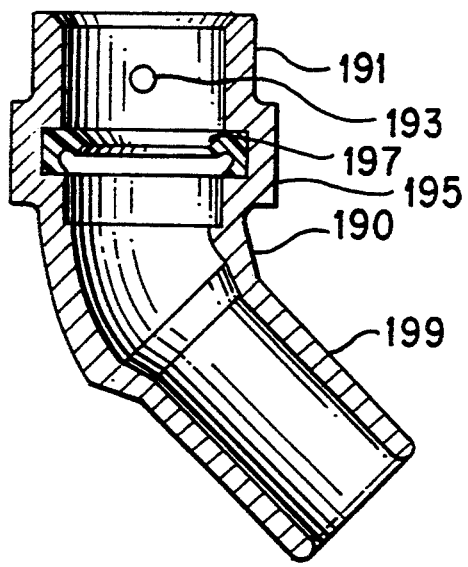
FIG. 19 is a cross-sectional view of another elbow coupling useful in the positioning assembly according to the present invention.
Figure 20:
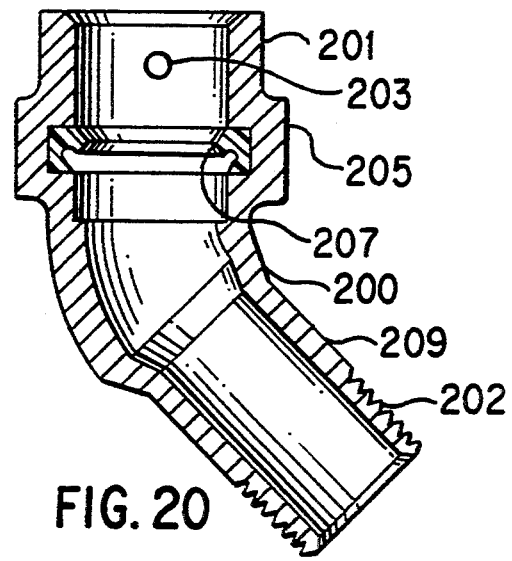
FIG. 20 is a cross-sectional view of another elbow coupling useful in the positioning assembly according to the present invention.

Yet an additional example of an acceptable elbow coupling is elbow coupling 100 as shown in FIG. 10. The elbow coupling 100 is conventionally known and has two opening portions 101, 102, each of which is configured the same as the inlet portions 81 and 91 of the elbow couplings 80 and 90 (see FIGS. 8 and 9). The first opening 101 has a seal support collar 104 for the seal 105 and includes a set screw 103. The second opening 102 includes a seal support collar 106 for a seal 107 and also includes a set screw 108. FIGS. 8-10 are examples of elbow couplings wherein the opening portions are positioned at a 90 degree angle from each other. However, spacing and orientation constraints sometimes are such that it is advantageous to use elbow couplings wherein the opening portions are positioned at about a 45 degree angle from each other. FIGS. 19 and 20 are examples of such fittings.

Referring to FIG. 19, an elbow coupling 190 includes an inlet portion 191 that is substantially the same as the inlet portion 191 of the first conduit member 10 of the first embodiment of the present invention (See FIG. 1). The inlet portion 191 includes a seal support collar 195 along with a seal 197 and a set screw 193. The elbow coupling 190 also includes an outlet portion 199 that is substantially the same as the outlet portion 22 of the second conduit member 20 of the fourth embodiment of the present invention (See FIG. 6). That is, the outlet portion 199 has a smooth outer circumferential surface.

Referring to FIG. 20, an elbow coupling 200 includes an inlet portion 201 that is substantially the same as the inlet portion of the first conduit member 10 of the first embodiment of the present invention (See FIG. 1). That is, the first inlet portion 201 includes a seal support collar 205 for a circumferential seal 207 along with a set screw 203 for securing the received member. The elbow coupling 200 also includes an outlet portion 209 that is substantially the same as the outlet portion 22 of the second conduit member 20 of the first embodiment of the present invention (See FIG. 1). That is, the outlet portion 209 includes external threads 202.

The particular embodiment of the positioning assembly of the present invention that is used will dictate which of the above disclosed elbow coupling members 80, 90, 100, 190, 200 will be utilized in any particular space constraining situation. For example, when the first embodiment of the adjustable sprinkler head positioning assembly of the present invention is used, the elbow coupling 100 may be advantageously used to achieve correct positioning of a sprinkler head as depicted in FIG. 11.

As shown in FIG. 11, two elbow couplings 100, along with extension pipes 111 and 112, may be utilized to position a sprinkler head in a location in a lateral direction X and a vertical direction Y that would be otherwise unattainable through the utilization of the conduit members 10, 20 by themselves. A first elbow coupling 100 is attached to the outlet portion 12 of the first conduit 10. A lateral extension pipe 111 is then positioned between the first elbow coupling 100 and a second elbow coupling 100. A vertical extension pipe 112 is then connected between the second elbow coupling 100 and the inlet portion 21 of the second conduit member 20. As assembled in this manner, the second conduit member 20 is still adjustable relative to the first conduit member 10, however, the adjustment is provided at a greater lateral and vertical distance from the drop line 120 than would otherwise be obtainable using the first and second conduit members alone.

Referring to FIG. 12, a situation occasionally arises wherein a drop-line fitting 28 is positioned such that there is insufficient space either in the lateral X direction or the vertical Y direction to use the first and second conduit members 10, 20 alone. However, such space constraints may be overcome without loss of adjustability through the utilization of an elbow coupling 90, two elbow couplings 100, a lateral extension pipe 111 and a vertical extension pipe 112. Specifically, the elbow coupling 90 is attached to the fitting 28 of the drop-line 120 so as to orient the outlet portion 92 of the coupling 90 in the vertical direction Y as shown in FIG. 13. The inlet portion 11 of the first conduit member 10 is then attached over the outlet portion 92 of the elbow coupling 90 while a first elbow coupling 100 is attached to the outlet portion 12 of the first conduit 10. The first elbow coupling 100 is then, in turn, connected to one end of the lateral extension pipe 111 while an opposite end of the extension pipe 111 is fixed to a second elbow coupling 100. The second elbow coupling 100 is connected to one end of the vertical extension pipe 112 while an opposite end of the vertical pipe 112 is received by the inlet portion 21 of the second conduit 20. As assembled in this manner, a desired location of a sprinkler head may yet be achieved despite space constraints in both the lateral X and vertical Y directions. Further, the adjustability of the positioning assembly is retained.

Overcoming the space constrictions depicted in FIG. 12 could be achieved with fewer parts if the fitting 28 were oriented upwardly from the drop-line 120 instead of from the side and if fitting 28 had a female configuration instead of a male configuration. (This alternate configuration is not shown in the drawings.) Through the utilization of such a fitting 28, the male portion of the first conduit 10 would be inserted into the fitting 28 and then, the male portion 92 of the coupling 90 would be inserted into the female portion of the first conduit member 10. The lateral extension pipe 111 would then be inserted into the female portion of the coupling 90. In this manner, there is no need of the additional coupling 100 yet full adjustability of the assembly is maintained.

Figure 25:
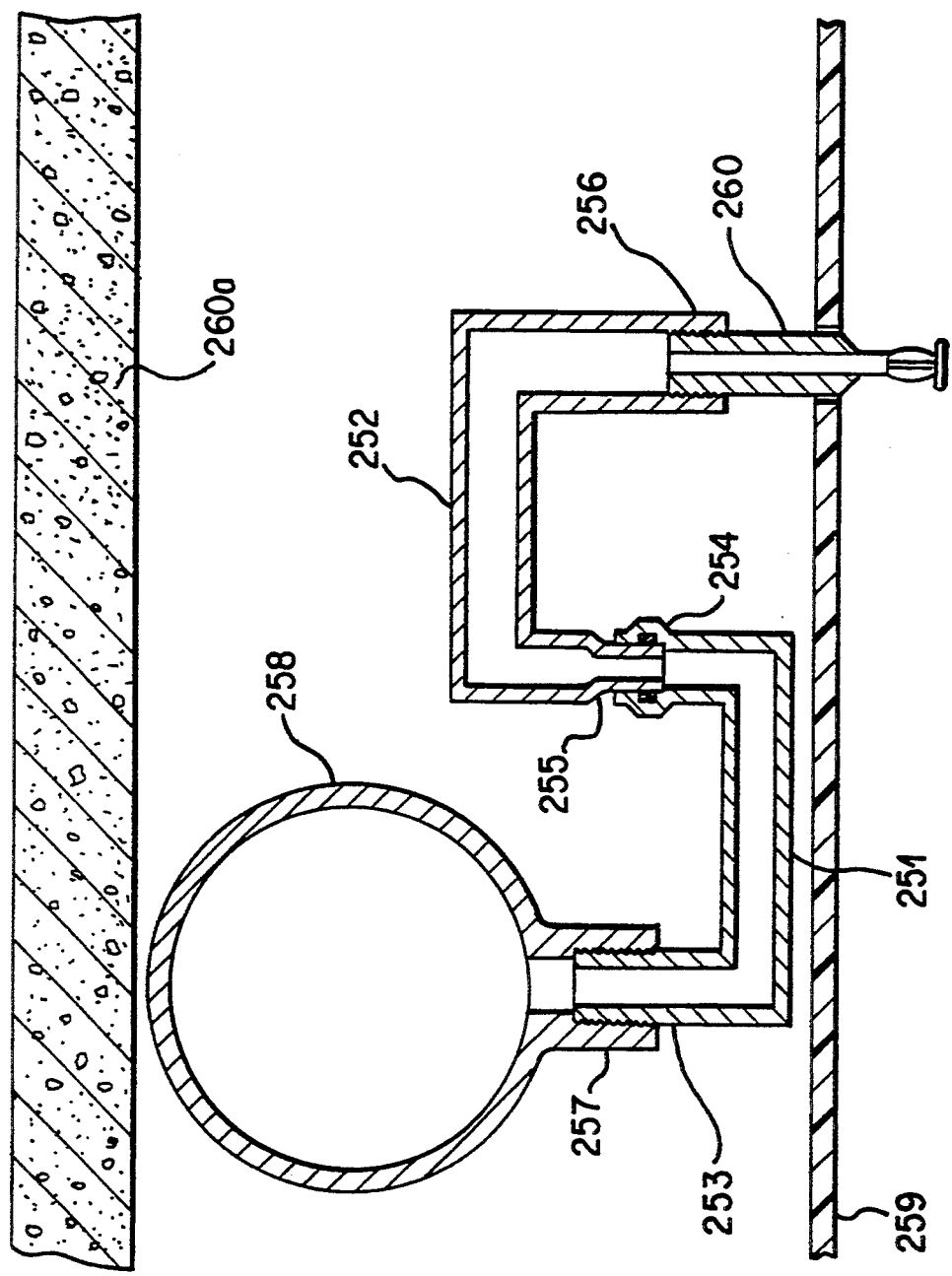
FIG. 25 is a cross-sectional view of another embodiment of the positioning assembly according to the present invention.

Referring to FIG. 25, a situation occasionally arises wherein space is especially restricted in the vertical direction between a floor 260 and the dropped ceiling 259 such that other embodiments of the present invention are not easily used. Such space constraints may be overcome while maintaining adjustability through the utilization of a pair of U-shaped conduit members 251, 252. The first conduit 251 includes an inlet portion 253 and an outlet portion 254, wherein the center lines of both the inlet portion 253 and outlet portion 254 are offset as with previously described embodiments. However, the first conduit 251 is configured to have a U-shape such that the direction of flow out of the conduit is opposite to the direction of the flow entering the conduit.

The second conduit 252 similarly includes an inlet portion 255 and an outlet portion 256 and is also configured to have a U-shape. The inlet portion 255 is configured to adjustably engage the outlet portion 254 of the first conduit 251. The outlet portion 256 is configured to receive the sprinkler head structure.

The U-shaped first and second conduits 251, 252 do not require as much vertical space as previously described embodiments of the present invention. Moreover, the offset nature of the centerlines of the inlet and outlet portions of each conduit maintain the adjustability of the sprinkler head positioning assembly when connected to a sprinkler water supply line 258.

The inlet and outlet portions of both the first and second conduits 251, 252 may be manufactured with any of the configurations as described with previous embodiments. In one embodiment, the inlet portion 253 of the first conduit 251 includes external threads which are engaged with internal threads of a pipe nipple 257 from the sprinkler water supply line 258. The outlet portion 254 of the first conduit 251 is configured with an attachment arrangement such as that utilized on the inlet portion of the conduit 10 depicted in FIG. 1.

The inlet portion 255 of the second conduit 252 has a smooth circumferential surface for engagement into the attachment arrangement, or socket, of the outlet portion 254 of the first conduit 251. The outlet portion 256 of the second conduit 252 includes internal threads for receiving a sprinkler head assembly 260.

Numerous other configurations utilizing the various embodiments of the present invention along with various elbow couplings to achieve virtually any desired location for a sprinkler head may be envisioned by the present invention. The examples specifically disclosed are merely exemplary.

In current sprinkler systems, a fitting known as a WELDOLET is sometimes used to serve as the outlet fixture on drop lines for attaching the sprinkler conduits. Such a fitting is described in an advertising publication entitled WELDOLET by B. F. Gilmour Co., Inc. The inlet of the WELDOLET is welded to a drop line at a desired location and then, in turn, a branch pipe, is welded to the outlet of the WELDOLET. The WELDOLET may be used to provide a fitting similar to the fitting 28 of FIGS. 11–13.

Figure 18:
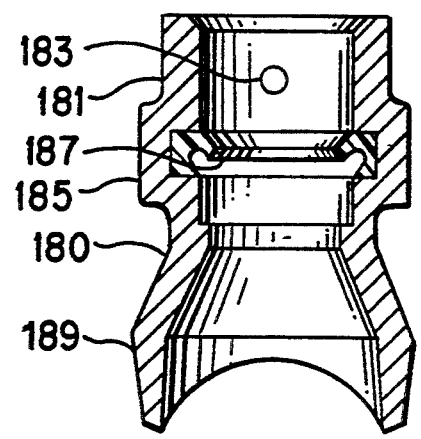
FIG. 18 is a cross-sectional view of a fitting useful in the positioning assembly according to the present invention.

To eliminate some of the welding steps involved with providing a suitable fitting on a sprinkler drop line and to enhance the versatility of the present invention, a fitting 180 as disclosed in FIG. 18 may be utilized. The outlet 181 of the fitting 180 includes an attachment arrangement, or socket, such as that included on several of previous embodiments of the first and second conduits. The socket includes a set screw 183 along with a seal support collar 185 and a resilient seal 187.

The inlet 189 of the fitting 180 is welded to a drop line in a manner similar to that used with the WELDOLET. Then, a branch pipe or other desired plumping section may be immediately secured to the fitting via the socket. In this manner, additional welding steps are avoided when preparing a drop line to receive sprinkler system plumbing sections. If desired, the fitting 180 may be lengthened and the socket oriented at 90° with respect to the inlet (not shown). Other angles may be provided as appropriate.

Figures 29, 31:
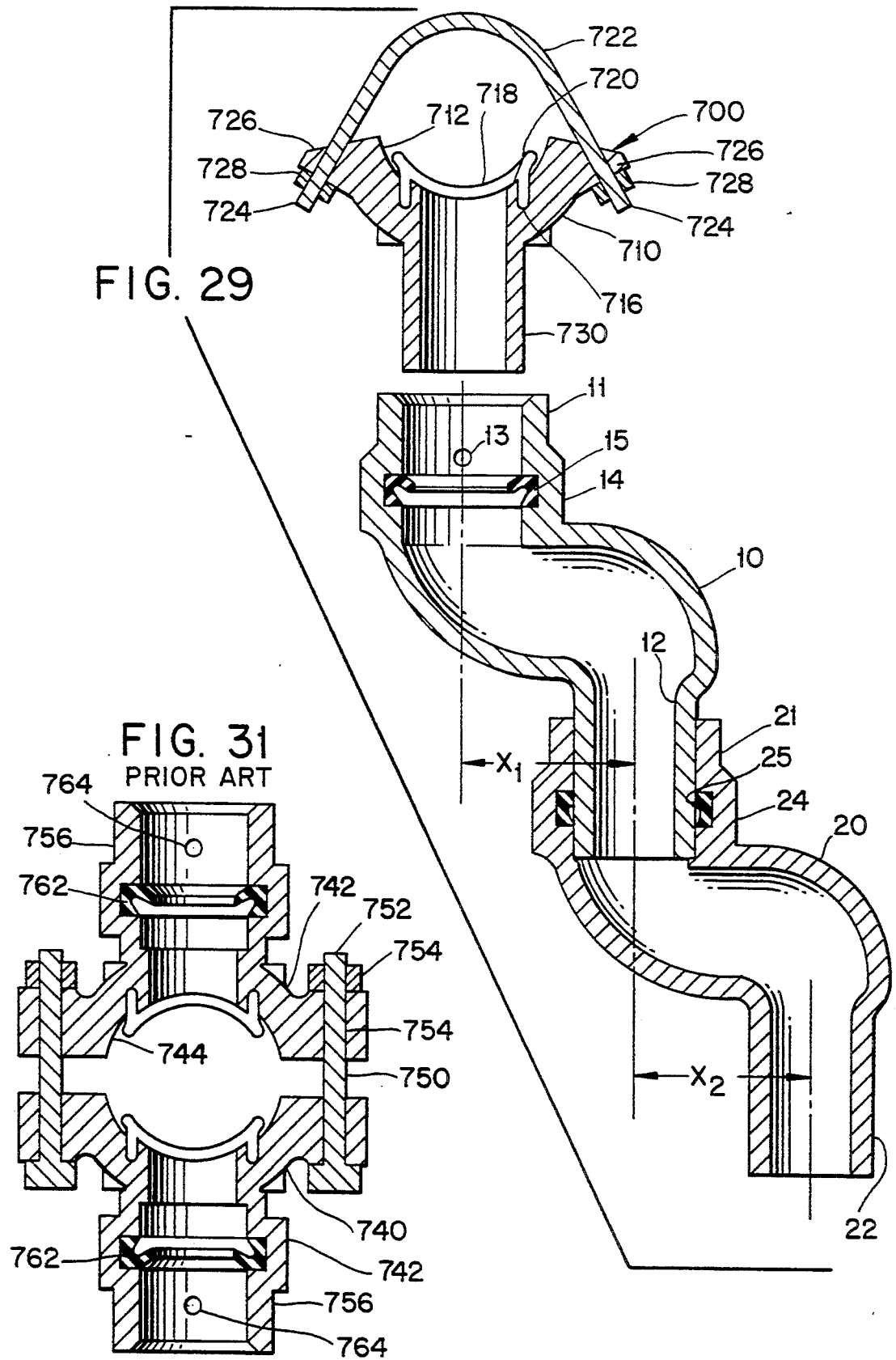
FIG. 29 is a cross-sectional view of another embodiment of the positioning assembly according to the present invention.
FIG. 31 is a cross-sectional view of a drop line fitting according to the prior art.

With reference now to FIG. 29, a drop line fitting 700 according to the present invention includes an inlet portion formed by a bracket member 710. The bracket member 710 includes a bottom surface 712 which corresponds generally to the curvature of a pipeline to which the drop line fitting is to be secured.

The bracket member 710 includes an annular channel 716 in the bottom surface 712 which is adapted to receive a resilient sealing member 718. If desired, the annular channel 716 and the resilient sealing member 718 may include portions which extend outwardly (not shown) whereby rotation of the sealing member 718 in the annular channel 716 is prevented.

Preferably, the inner wall of the annular channel forms an annular projection 720 which extends slightly beyond the bottom surface 712 of the bracket member 712. In this way, if a hole is provided in the pipeline which has a diameter slightly larger than the diameter of the inner wall of the annular channel, the annular projection 720 extends into the hole in the pipeline and helps to prevent movement of the bracket member 710 relative to the pipeline.

A U-bolt 722 is provided to releasably secure the bracket member 710 to the pipeline. The U-bolt has a midsection which has a curvature generally corresponding to the curvature of the pipeline. The U-bolt 722 has threaded ends 724 which are received by passageways 726 provided in the bracket member 710. Because the threaded ends of the U-bolt are not parallel to one another, the passageways are formed as slots so as to permit the assembly of the U-bolt and the bracket member. The threaded ends 724 of the U-bolt receive nuts 728 which are used to securely fasten the drop line fitting to the pipeline.

If desired, the threaded ends of the U-bolt may be generally parallel to one another (not shown) and received within holes provided in the bracket member 710.

The annular projection of the bracket member forms an inlet portion for the fitting with the annular projection being in communication with an outlet portion 730 which is generally aligned with the annular projection 720. The outlet portion 730 has a smooth outer circumference and is adapted to be received by the inlet portion 11 of the first conduit 10. The inlet portion includes a seal support collar 14 along with a resilient seal 15 and a set screw 13. The seal 15 provides a fluid tight connection between the outlet portion 730 and the inlet portion of the first conduit 10. The set screw 13 enables the first conduit 10 to be secured to the outlet portion 730 in any desired orientation about 360°.

Alternatively, the outlet portion may be received by the inlet portion of various plumbing fittings as described in the foregoing specification. In each case, however, the inlet portion includes a seal support collar along with a seal and a set screw. The seal provides a fluid tight connection between the outlet portion 730 and the inlet portion of the plumbing fitting. The set screw enables the plumbing fitting to be secured to the outlet portion 730 in any desired orientation about 360°.

Figure 30:
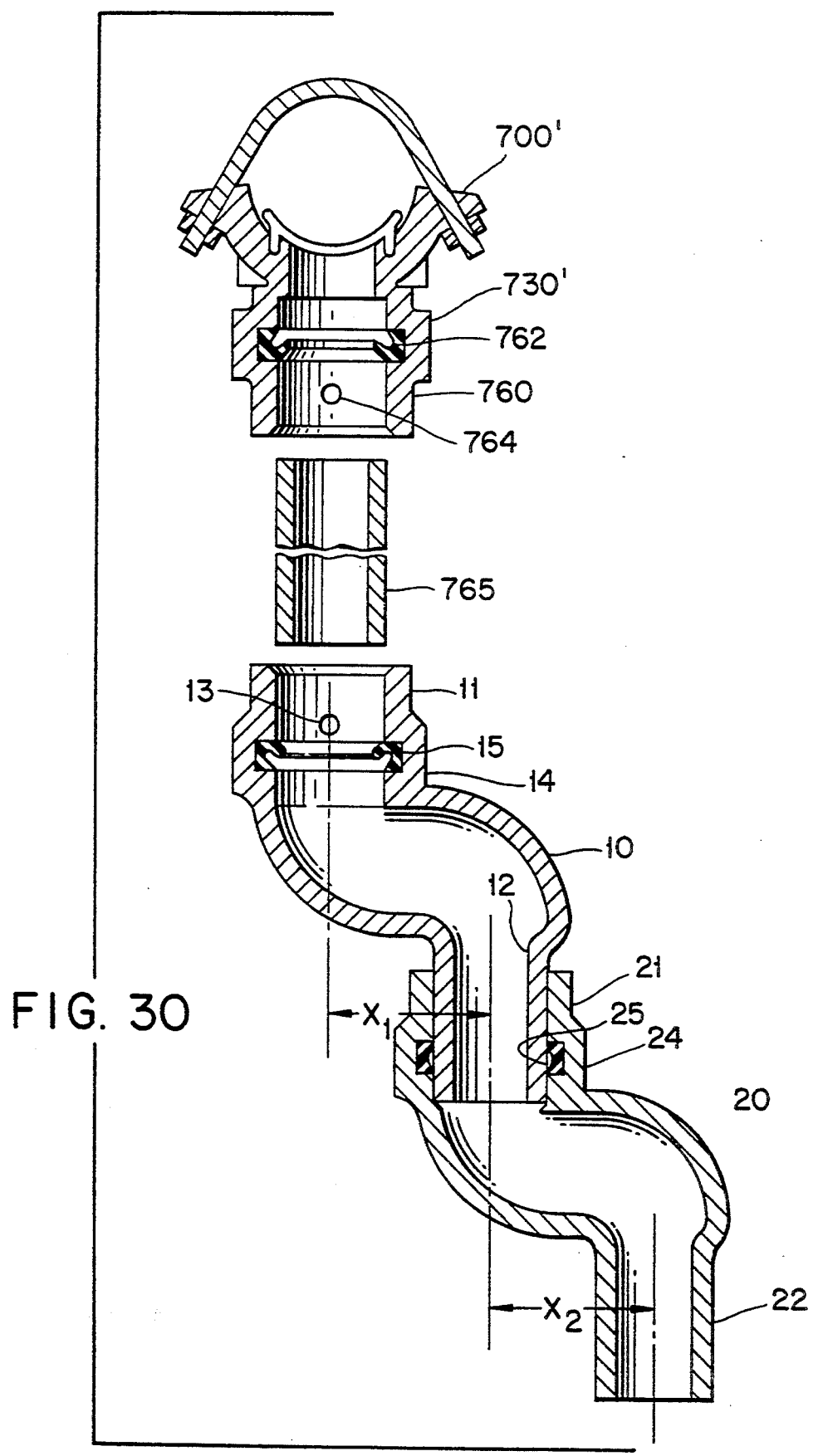
FIG. 30 is a cross-sectional view of another embodiment of the positioning assembly according to the present invention.

With reference now to FIG. 30, a more preferred form of the drop line fitting 700' according to the present invention corresponds generally to the drop line fitting 700 of FIG. 29 except that the outlet portion 730' includes a seal support collar 760 along with a resilient seal 762 and a set screw 764. The seal 762 provides a fluid tight connection between the outlet portion 730 and the inlet portion of various plumbing fittings as described in the foregoing specification. In each case, however, the inlet portion of the plumbing fitting includes a smooth outer circumference which is adapted to be received by the seal support collar 760. The seal 762 provides a fluid tight connection between the outlet portion 730' and the inlet portion of the plumbing fitting. The set screw enables the plumbing fitting to be secured to the outlet portion 730' in any desired orientation about 360°.

In the preferred embodiment, a nipple 765 having a length suitable to position the first conduit 10 and the second conduit 20 at a desired vertical position relative to a ceiling tile is provided between the seal support collar 760 and the inlet 11 of the first conduit 10. One end of the nipple is received by the socket of the drop line fitting and the other end of the nipple is received by the socket of the first conduit 10.

In another preferred embodiment, the drop line fitting 700' is provided on a pipeline so that the outlet extends upwardly (not shown). An elbow having a smooth male inlet portion is received by the socket of the drop line fitting and then rotated to a desired orientation. The set screw of the socket on the drop line fitting is then tightened to secure the elbow with respect to the drop line fitting. Appropriate plumbing fittings are then provided as desired to connect the outlet of the elbow with the inlet of a first conduit 10.

With reference to FIG. 31, another drop line fitting 740 according to the present invention includes a pair of bracket members each of which includes an inlet portion formed by a bracket member 742. Each bracket member 742 includes a bottom surface 744 which corresponds generally to the curvature of a pipeline to which the drop line fitting is to be secured.

Each bracket member 740 includes an annular channel (see FIG. 29) in the bottom surface 744 which is adapted to receive a resilient sealing member. If desired, the annular channel and the resilient sealing member of each bracket member 742 may include portions which extend outwardly (not shown) whereby rotation of the sealing member in the annular channel is prevented.

Preferably, the inner wall of the annular channel of each bracket member 742 forms an annular projection which extends slightly beyond the bottom surface 744 of the bracket member 740. In this way, if a hole is provided completely through the pipeline which hole has a diameter slightly larger than the diameter of the inner wall of the annular channel, the annular projections 748 extend into the hole in the pipeline and help to prevent movement of the bracket member 740 relative to the pipeline.

A pair of bolts 750 releasably secure the two bracket members 740 to each other and to the pipeline. The bolts 750 each have a threaded end 752 and the bolts are received by passageways 754 provided in the bracket members 740. The threaded ends 752 of the bolts receive nuts 755 which are used to securely fasten the drop line fitting to the pipeline.

Each of the annular projections of the bracket members forms an inlet portion for the fitting with the annular projections being in communication with a respective outlet portion 756 which is generally aligned with the annular projection. Each outlet portion 756 has a socket as described above in connection with the embodiment of FIG. 30 which is adapted to receive the inlet portion of various plumbing fittings as described in the foregoing specification. In each case, however, the inlet portion includes a smooth outer circumferential surface. The seal in the socket provides a fluid tight connection between the outlet portion 756 and the inlet portion of the plumbing fitting. The set screw enables the plumbing fitting to be secured to the outlet portion 756 in any desired orientation about 360°.

In this way, the drop line fitting 740 of FIG. 31 enables a pair of opposed drop lines to be provided from a pipeline using only one drop line fitting.

In use, a hole of the appropriate size is provided in a sprinkler system pipeline at a location where a drop line is desired. The bracket of a drop line fitting according to the present invention is then positioned over the hole with the annular projection of the bracket preferably extending slightly into the hole in the pipeline. The threaded U-bolt (or the opposite bracket member, if desired) is positioned over the pipeline with the threaded ends of the U-bolt being received by the corresponding openings in the bracket. Nuts on the threaded ends of the U-bolt are then tightened which urges a resilient sealing member provided around the annular projection to seal the pipeline with respect to the inlet of the drop line fitting.

The outlet of the drop line fitting may then be connected to the inlet of a first conduit according to the present invention directly or may be connected to other plumbing fittings including a nipple of an appropriate length as desired. If the outlet of the drop line conduit is provided with a portion having a smooth circumferential surface, the portion is received within a socket of the other plumbing fitting and then the plumbing fitting is rotated to the desired orientation. The set screw is then rotated to secure the other plumbing fitting to the outlet of the drop line fitting. A sealing member in the socket seals the outlet of the drop line fitting with respect to the socket of the other plumbing fitting. If the drop line fitting is provided with a socket, the smooth inlet of a plumbing fitting is inserted into the socket, the plumbing fitting is rotated to the desired orientation and then the set screw is tightened to secure the plumbing fitting to the drop line fitting.

Figure 43:
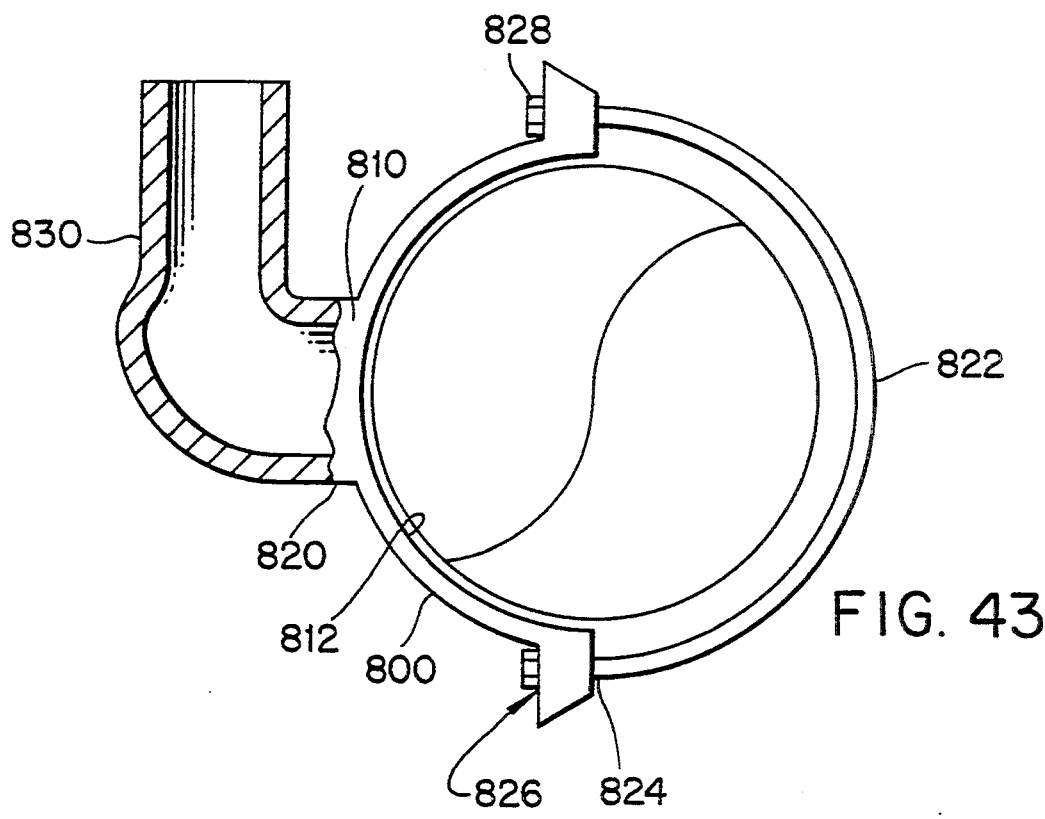
FIG. 43 is a cross-sectional view of another embodiment of a drop line fitting according to the present invention.

With reference now to FIG. 43, another drop line fitting 800 according to the present invention includes an inlet portion formed by a bracket member 810. The bracket member 810 includes a bottom surface 812 which corresponds generally to the curvature of a pipeline to which the drop line fitting is to be secured (see also the embodiment of FIG. 29).

The bracket member 810 includes an annular channel in the bottom surface 812 which is adapted to receive a resilient sealing member. If desired, the annular channel and the resilient sealing member may include portions which extend outwardly whereby rotation of the sealing member in the annular channel is prevented.

Preferably, the inner wall of the annular channel forms an annular projection which extends slightly beyond the bottom surface of the bracket member. In this way, if a hole is provided in the pipeline which has a diameter slightly larger than the diameter of the inner wall of the annular channel, the annular projection extends into the hole in the pipeline and helps to prevent movement of the bracket member relative to the pipeline.

A U-bolt 822 is provided to releasably secure the bracket member 810 to the pipeline. The U-bolt has a midsection which has a curvature generally corresponding to the curvature of the pipeline. The U-bolt 822 has threaded ends 824 which are received by passageways 826 provided in the bracket member 810. Preferably, the threaded ends of the U-bolt are parallel to one another. The threaded ends 824 of the U-bolt receive nuts 828 which are used to securely fasten the drop line fitting to the pipeline.

According to the present invention, the annular projection of the bracket member forms an inlet portion for the fitting with the annular projection being in communication with an outlet portion 830 which is oriented at 90° with the inlet or annular projection 820. The outlet portion 830 has a smooth outer circumference and is adapted to be received by a socket of another fitting as described above. The socket includes a seal support collar along with a resilient seal and a set screw. The seal provides a fluid tight connection between the outlet portion 830 and the socket. The set screw enables the fitting to be secured to the outlet portion 830 in any desired orientation generally about 180° (rather than 360°) because of the supply pipeline.

Figure 44:
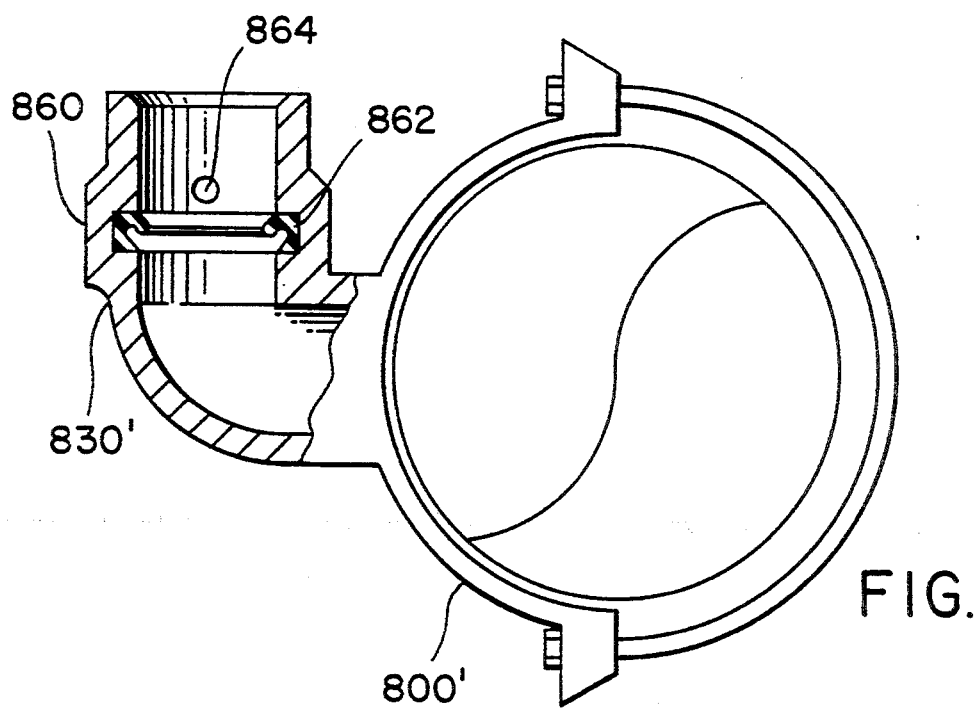
FIG. 44 is a cross-sectional view of another embodiment of a drop line fitting according to the present invention.

With reference now to FIG. 44, a more preferred form of the drop line fitting 800' according to the present invention corresponds generally to the drop line fitting 800 of FIG. 43 except that the outlet portion 830' includes a seal support collar 860 along with a resilient seal 862 and a set screw 864. The seal 862 provides a fluid tight connection between the outlet portion 830 and a spigot provided as the inlet portion of various plumbing fittings as described in the foregoing specification. In each case, the spigot or inlet portion of the plumbing fitting includes a smooth outer circumference which is adapted to be received by the seal support collar 860. The seal 862 provides a fluid tight connection between the outlet portion 830' and the inlet portion of the plumbing fitting. The set screw enables the plumbing fitting to be secured to the outlet portion 830' in any desired orientation generally about 180° (rather than 360°) because of the supply pipeline.

In the preferred embodiment, the drop line fitting 800' is provided on a pipeline so that the outlet extends upwardly at 90° with respect to the inlet of the drop line fitting.

Figure 45:
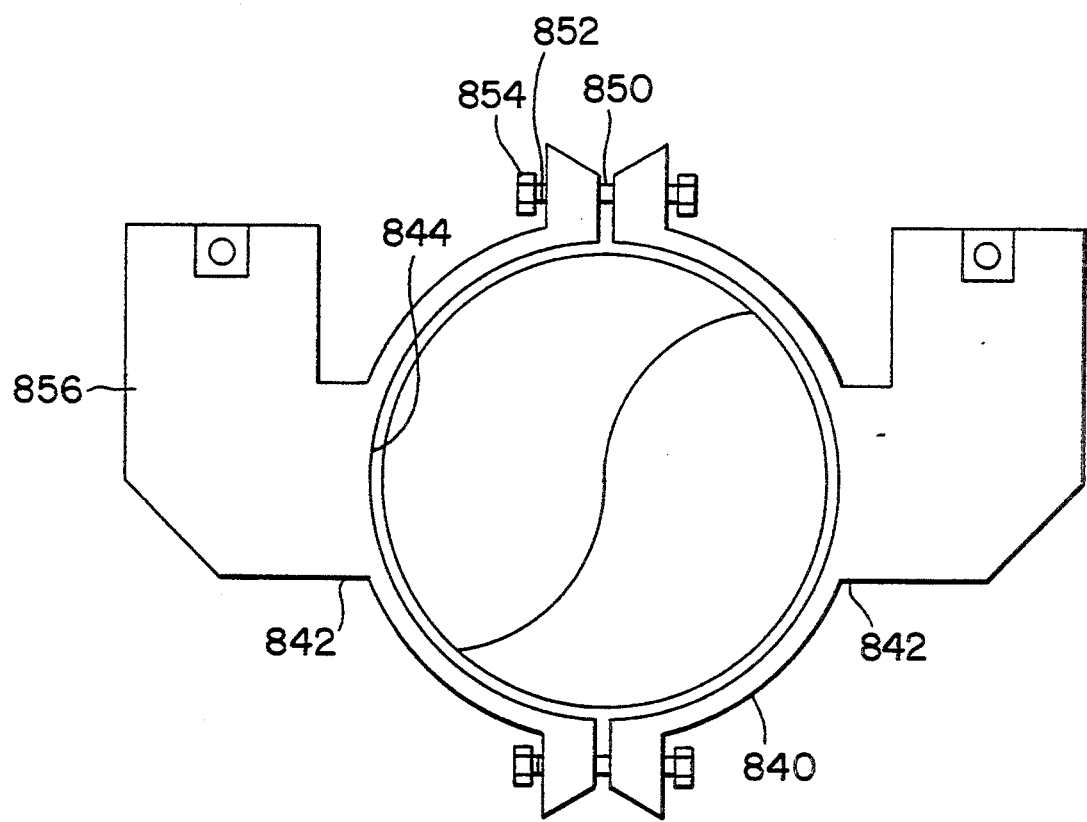
FIG. 45 is a cross-sectional view of another embodiment of a ,drop line fitting according to the present invention.

With reference to FIG. 45, another drop line fitting 840 according to the present invention includes a pair of bracket members each of which includes an inlet portion formed by a bracket member 842. Each bracket member 842 includes a bottom surface 844 which corresponds generally to the curvature of a pipeline to which the drop line fitting is to be secured.

Each bracket member 840 includes an annular channel (see FIG. 29) in the bottom surface 844 which is adapted to receive a resilient sealing member. If desired, the annular channel and the resilient sealing member of each bracket member 842 may include portions which extend outwardly (not shown) whereby rotation of the sealing member in the annular channel is prevented.

Preferably, the inner wall of the annular channel of each bracket member 842 forms an annular projection which extends slightly beyond the bottom surface of the bracket member. In this way, if a hole is provided completely through the pipeline which hole has a diameter slightly larger than the diameter of the inner wall of the annular channel, the annular projections extend into the hole in the pipeline and help to prevent movement of the bracket member 840 relative to the pipeline.

A pair of bolts 850 releasably secure the two bracket members 840 to each other and to the pipeline. The bolts 850 each have a threaded end 852 and the bolts are received by passageways provided in the bracket members 840. The threaded ends 852 of the bolts receive nuts 854 which are used to securely fasten the drop line fitting to the pipeline.

Each of the annular projections of the bracket members forms an inlet portion for the fitting with the annular projections being in communication with a respective outlet portion 856. Each outlet portion 856 has a socket oriented at 90° with respect to the inlet of the drop line fitting as described above in connection with the embodiment of FIG. 44 which is adapted to receive a spigot provided as the inlet portion of various plumbing fittings as described in the foregoing specification. In each case, the spigot or inlet portion includes a smooth outer circumferential surface. The seal in the socket provides a fluid tight connection between the outlet portion 856 and the inlet portion of the plumbing fitting. The set screw enables the plumbing fitting to be secured to the outlet portion 856 in any desired orientation generally about 180° (rather than 360°) because of the supply pipeline.

In this way, the drop line fitting 840 of FIG. 45 enables a pair of opposed drop lines to be provided from a pipeline using only one drop line fitting. With reference to FIGS. 45–45, by providing the socket or spigot at 90° with respect to the inlet, a savings of about three inches in overall length may be obtained for a typical piping configuration having a one inch inside diameter. This provides a significant savings in height especially when the total available height above the ceiling is only 12 to 16 inches. Each of the spigots or sockets provided at 90° to the inlet provides an adjustable connection which may be rotated after installation through at least 180° in order to facilitate the preferred positioning of a sprinkler head with respect to the supply pipeline.

The drop line fittings of FIGS. 45–45 may be oriented with the spigots or sockets of the outlet oriented upwardly (as shown) or downwardly or in any desired orientation depending upon the circumstances present at the installation site.

Figure 32:
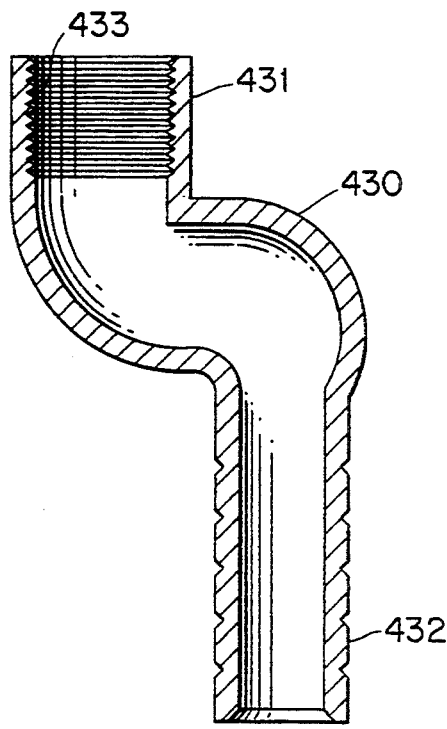
FIG. 32 is a cross-sectional view of another conduit in accordance with an additional embodiment of the present invention.

Referring now to FIG. 32, a conduit 430 includes an outlet portion 432 and an inlet portion 431. The outlet portion 432 is configured to have a smooth outer circumferential surface and the inlet portion 431 is configured with internal threads 433.

The outlet portion 432, however, has an increased length which is approximately twice as long as the length of the outlet portion 12 of the embodiment of FIG. 1. For example, the outlet portion 432 may have a length of about 3.5 inches in comparison with the typical length of 1.75 inches for the outlet 12 of the conduit 10 in FIG. 1.

With reference now to FIG. 38, a conduit 432 has an inlet 438 formed as a socket 440. The socket 440 corresponds generally to the socket provided at the inlet portion 11 of the conduit 10 (see FIG. 1). However, the socket 440 of the embodiment of FIG. 38 has a deepened passageway 442 which has a length approximately twice as long as the socket provided in the conduit of FIG. 1.

The conduit 436 has an outlet portion 444 formed as a reduced threaded coupling so as to receive a sprinkler head. Typically, the outlet portion 444 is provided with a ½ inch internal diameter.

With reference now to FIG. 37, the outlet 432 of the conduit 430 may be received by the socket 440 of the inlet portion 438 of the conduit 436. In this way, the outlet 432 may be selectively inserted or withdrawn relative to the deepened passageway 442 in order to provide a vertical adjustment for the sprinkler head positioning arrangement.

Figure 33:
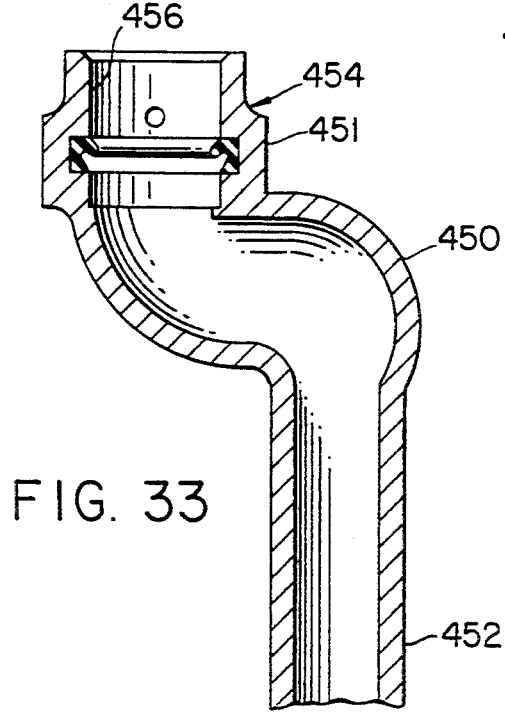
FIG. 33 is a cross-sectional view of another conduit in accordance with an additional embodiment of the present invention.

With reference now to FIG. 33, a conduit 450 includes an outlet portion 452 and an inlet portion 451. The outlet portion 452 is configured to have a smooth outer circumferential surface and the inlet portion 451 is configured as a socket 454. The socket has a standard depth passageway 456. The outlet portion 452, however, has an increased length, for example approximately 3.5 inches, which is about twice as long as the length of the outlet portion 12 of the embodiment of FIG. 1.

With reference now to FIG. 36, if no vertical adjustment is desired between the first and second conduits, the lengthened outlet 432 of the conduit 430 could be received by the standard socket 454 of the conduit 450. Vertical adjustment may be provided by the lengthened outlet portion 452 which may be slidingly received by a nipple 460 (see FIG. 39).

The nipple 460 is formed as a deepened socket 462 with a reduced diameter threaded outlet typically having an internal diameter of ½ inch. The nipple 460 may be selectively positioned along the outlet portion 452 of the conduit 450 (see FIG. 33) so as to provide a vertical adjustment for the sprinkler head (not shown) relative to the second conduit 450 (see FIG. 36).

Figure 34:
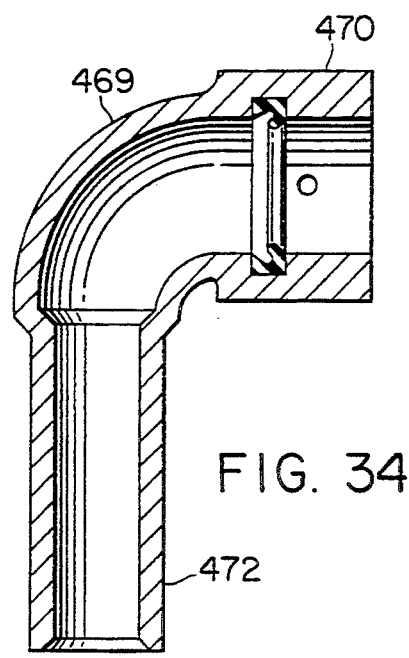
FIG. 34 is a cross-sectional view of another elbow of the positioning assembly according to the present invention.

With reference now to FIG. 34, a 90° elbow 469 has one end configured as a standard socket 470 having a set screw and sealing arrangement as described in connection with the attachment arrangement or socket of the embodiment of FIG. 1.

The elbow 469 has another end 472 configured to have a smooth outer circumferential surface to be received within a socket (either a standard length socket or a deepened socket to provide lengthwise adjustability).

Figure 35:
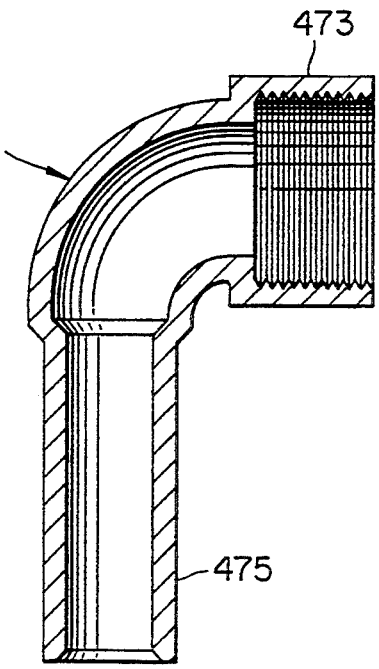
FIG. 35 is a cross-sectional view of another elbow of the positioning assembly according to the present invention.

With reference to FIG. 35, another elbow 471 has one end 473 configured with female threads and the other end 745 configured to have a smooth outer circumferential surface to be received within a socket (either a standard length socket or a deepened socket to provide lengthwise adjustability).

With reference now to FIG. 42, another elbow 480 has one end 482 provided with female threads and the other end 484 formed as a socket corresponding generally to the sockets provided at the inlet portion 171 and the outlet portion 172 of the conduit 170 (see FIG. 17). The elbow 480 may be a 90° elbow or a 45° elbow (not shown).

In each of the embodiments of conduits and elbows having lengthened outlets, (for example, FIGS. 32-37 and 40) the lengthened outlets could be provided with grooves or scoring at ½ inch increments in order to facilitate a shortening of the outlet, see FIG. 32. These grooves are preferably provided in the spigot during the casting of the conduit or fitting and are especially preferable in connection with the use of ductile cast iron. The spigot may be cut to the desired length during installation.

With reference now to FIG. 40, another arrangement for connecting the inlet of the first conduit to a supply pipe includes a union tailpiece 500 which has female threads at an inlet 502 of the tailpiece. The outlet 504 of the tailpiece is provided with a curved union mating surface 506 which corresponds to a union mating surface 508 provided at the inlet 510 of the first conduit 512. A union nut 514 threadably engages male threads on the inlet 510 to urge the union mating surfaces toward one another. Preferably, the union tailpiece, union nut and union mating surfaces are configured so as to provide a passageway for fluid having a minimum cross sectional dimension of, for example, one inch.

The union mating surfaces can be gasketed, if desired, or may be a ground joint.

With reference now to FIG. 41, another embodiment of the adjustable sprinkler head positioning assembly according to the present invention includes a first conduit 610 which is fabricated preferably of cast iron pipe but may be fabricated from any material suitable for transporting water under pressure in compliance with the applicable fire codes and regulations. The first conduit 610 includes an inlet portion 611 having a circular cross-section (as in pipe or tubing) and an outlet portion 612 having a circular cross-section. The first conduit 610 is fabricated to have a smooth and substantially constant area internal cross-section between the inlet portion 611 and the outlet portion 612 and the center line of the inlet portion 611 is parallel to, but offset from, the center line of the inlet portion 612.

Female threads are provided at the inlet portion 611 for connecting the first conduit 610 to a sprinkler system drop line fitting 628. When the first conduit 610 is initially connected to a fitting 628 of a sprinkler system drop line, the first conduit 610 is not fully tightened onto the fitting 628 so as to enable the first conduit 610 to be subsequently rotated relative to the fitting 628. However, the first conduit 610 is threaded onto the fitting 628 sufficiently to provide a leak-tight engagement of the fitting 628 and the inlet of the first conduit 610.

The sprinkler head positioning assembly includes a second conduit 620 having an inlet portion 621 having a circular cross-section and an outlet portion 622 having a circular cross-section. The second conduit 620 is fabricated to have a smooth constant area internal cross-section between the inlet portion 621 and the outlet portion 622 and the center lines of both the inlet portion 621 and the outlet portion 622 are parallel to each other but offset. The second conduit 620 is preferably of cast iron but may be fabricated from any material suitable for transporting water under pressure in compliance with the applicable fire codes and regulations.

As with the inlet portion 611 of the first conduit 610, the inlet portion 621 of the second conduit 620 also includes female threads. The inlet of the second conduit 620 is used for connecting the second conduit 620 to the first conduit 610. In particular, the inlet portion 621 of the second conduit 620 is configured to receive the outlet portion 612 of the first conduit 610 which is provided with male threads.

On the outlet portion 622 of the second conduit 620 are disposed external threads 626. The external or male threads 626 are suitable for receiving a sprinkler head. To enable use of the assembly for certain sprinkler heads, the outlet portion 622 may be fabricated with internal threads instead. In the assembled condition, the outlet portion 612 of the first conduit 610 is threadably received within the inlet portion 621 of the second conduit 620. More specifically, the outlet portion 612 is positioned such that snug, liquid tight contact exists between the outlet portion 612 and the inlet portion 621.

Initially the second conduit is not fully tightened onto the first conduit so as to permit adjustment of the first and second conduits during final positioning of the outlet of the second conduit in a desired location (typically at the center of a ceiling tile).

The threaded connections at the inlet of the first conduit and between the outlet of the first conduit and the inlet of the second conduit typically enable about a full rotation while still providing a fluid tight sealing arrangement. However, once the arrangement of FIG. 41 has been tightened, loosening of the threaded connections by more than about 5° to 10° oftentimes results in leakage requiring the fittings to be disassembled and then reassembled. The fittings may be further tightened (rather than loosened) usually up to one full rotation per fitting.

In the arrangement of FIG. 41, the first and second conduits 610, 620 may be identical to one another to facilitate manufacture and to reduce costs.

While the adjustable sprinkler head positioning assembly according to the present invention has been described with reference to a water sprinkler system, it is expected that the assembly may be of general utility in systems other than water sprinkler systems. Accordingly, the principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, may be embraced thereby.

What is claimed is:

1. An adjustable fire-suppression sprinkler head positioning assembly comprising:
    a first conduit having a first conduit inlet and a first conduit outlet wherein a center line of the first conduit outlet is offset from and parallel to a center line of the first conduit inlet, said first conduit inlet and said first conduit outlet being oriented to direct fluid flow in the same direction, the first conduit inlet and the first conduit outlet being substantially circular in cross section and the centerlines of said first conduit inlet and of said first conduit outlet being offset in the radial direction by a distance equal to at least the diameter of said first conduit inlet, said first conduit outlet having a smooth outer circumferential surface with a smooth outer contour;
    a second conduit having a second conduit inlet and a second conduit outlet wherein a center line of the second conduit outlet is offset from and parallel to a center line of the second conduit inlet, said second conduit inlet and said second conduit outlet being oriented to direct fluid flow in the same direction, the second conduit inlet and the second conduit outlet being substantially circular in cross section and the centerlines of said second conduit inlet and said second conduit outlet being offset in the radial direction by a distance equal to at least the diameter of said second conduit inlet, said second conduit inlet comprising a socket, said socket being integral with said second conduit, said smooth outer circumferential surface with a smooth outer contour of said first conduit outlet being receivable within said socket, said socket having a set screw for securing said second conduit in a desired circumferential position relative to said first conduit, said socket further comprising sealing means for preventing fluid leakage between said first conduit outlet and said second conduit inlet;
    means for receiving a sprinkler head, said means for receiving being disposed at said second conduit outlet;
    first attachment means for adjustably securing said first conduit to a sprinkler drop line which is disposed behind a surface from which a sprinkler head is intended to protrude, said first attachment means being disposed at said first inlet of said first conduit, said first attachment means being integral with said first conduit;
    whereby said means for receiving a sprinkler head may be variably positioned so as to be provided at a predetermined location along said surface from which a sprinkler head is intended to protrude.

2. An adjustable fire-suppression sprinkler head positioning assembly according to claim 1, wherein said first attachment means comprises a socket, said socket being integral with said first conduit, a smooth outer circumferential surface with a smooth outer contour of a fitting provided on the sprinkler drop line being receivable within said socket, said socket having a set screw for securing said first conduit in a desired circumferential position relative to said sprinkler drop line, said socket further comprising sealing means for preventing fluid leakage between said first conduit inlet and said smooth outer circumferential surface with a smooth outer contour of said fitting provided on the sprinkler drop line.

3. An adjustable fire-suppression sprinkler head positioning assembly as set forth in claim 2, wherein said means for receiving a sprinkler head comprises a smooth outer circumferential surface with a smooth outer contour provided at said second conduit outlet, said first conduit including said socket of said first conduit inlet and said smooth outer circumferential surface with a smooth outer contour of said first conduit outlet being identical to said second conduit including said socket of said second conduit inlet and said smooth outer circumferential surface with a smooth outer contour of said second conduit outlet, whereby the same tooling forms both the first conduit and the second conduit.

4. An adjustable fire-suppression sprinkler head positioning assembly as set forth in claim 1, wherein said first attachment means comprises a threaded female socket, said threaded female socket being integral with said first conduit, a threaded male end of a fitting provided on the sprinkler drop line being receivable within said threaded female socket, whereby said first conduit may be provided in a desired circumferential position relative to said sprinkler drop line while maintaining a fluid sealing relationship between said first conduit inlet and said threaded male end of said fitting.

5. An adjustable fire-suppression sprinkler head positioning assembly as set forth in claim 1, wherein said means for receiving a sprinkler head comprises a smooth outer circumferential surface with a smooth outer contour provided at said second conduit outlet.

6. An adjustable fire-suppression sprinkler head positioning assembly as set forth in claim 1, wherein said first and second conduits are formed of black steel.

7. An adjustable fire-suppression sprinkler head positioning assembly as set forth in claim 1, wherein said means for receiving a sprinkler head comprises female threads provided at said second conduit outlet.

8. An adjustable fire-suppression sprinkler head positioning assembly according to claim 1 wherein said inlet of said first conduit is provided with male threads.

9. An adjustable fire-suppression sprinkler head positioning assembly as set forth in claim 7, wherein said female threads of said second conduit outlet have a reduced diameter compared to the inside diameter of said second conduit inlet.

10. An adjustable fire-suppression sprinkler head positioning assembly according to claim 1, wherein said sprinkler head comprises a wet drop nipple which is vertically adjustable relative to said second conduit outlet.

11. An adjustable fire-suppression sprinkler head positioning assembly according to claim 7, wherein said means for receiving a sprinkler head includes means for vertically adjusting said sprinkler head relative to said second conduit outlet while maintaining a fluid sealing relationship between said second outlet of said second conduit and said means for vertically adjusting.

12. An adjustable fire-suppression sprinkler head positioning assembly according to claim 1, wherein said means for receiving a sprinkler head includes a tube extension of a predetermined length that is vertically adjustable relative to said second conduit outlet.

13. An adjustable fire-suppression sprinkler head positioning assembly according to claim 12, wherein said means for receiving a sprinkler head includes a compression fitting for securing said tube extension to said second conduit outlet.

14. An adjustable fire-suppression sprinkler head positioning assembly according to claim 1 wherein said first conduit and said second conduit are cast.

15. An adjustable fire-suppression sprinkler head positioning assembly according to claim 1 wherein said first conduit has a height which is about 6 times the minimum cross sectional diameter of the first conduit and wherein the second conduit has a height which is about 6 times the minimum cross sectional diameter of the second conduit.

16. An adjustable fire-suppression sprinkler head positioning assembly according to claim 1 wherein said first conduit and said second conduit when connected together have a total height which is about 10 times the minimum cross sectional diameter of the second conduit.

17. An adjustable fire-suppression sprinkler head positioning assembly comprising:
a first conduit having a first conduit inlet and a first conduit outlet wherein a center line of the first conduit outlet is offset from and parallel to a center line of the first conduit inlet, said first conduit inlet and said first conduit outlet being oriented to direct fluid flow in the same direction, the first conduit inlet and the first conduit outlet being substantially circular in cross section and the centerlines of said first conduit inlet and of said first conduit outlet being offset in the radial direction by a distance equal to at least the diameter of said first conduit inlet, said first conduit inlet comprising an integral socket provided with female threads and said first conduit outlet comprising male threads, said integral socket provided with female threads adjustably securing said first conduit to a sprinkler drop line which is disposed behind a surface from which a sprinkler head is intended to protrude;
a second conduit having a second conduit inlet and a second conduit outlet wherein a center line of the second conduit outlet is offset from and parallel to a center line of the second conduit inlet, said second conduit inlet and said second conduit outlet being oriented to direct fluid flow in the same direction, the second conduit inlet and the second conduit outlet being substantially circular in cross section and the centerlines of said second conduit inlet and said second conduit outlet being offset in the radial direction by a distance equal to at least the diameter of said second conduit inlet, said second conduit inlet comprising an integral socket provided with female threads, said male threads of said first conduit outlet being threadably receivable by said female threads of said integral socket of said second conduit inlet with said second conduit in a desired circumferential position relative to said first conduit while maintaining a fluid sealing relationship between said first conduit outlet and said second conduit inlet;
means for receiving a sprinkler head, said means for receiving being disposed at said second conduit outlet and comprising male threads;
said first conduit including said socket of said first conduit inlet and said male threads of said first conduit outlet being identical to said second conduit including said socket of said second conduit inlet and said male threads of said second conduit outlet, whereby the same tooling forms both the first conduit and the second conduit;
whereby said means for receiving a sprinkler head may be variably positioned so as to be provided at a predetermined location along said surface from which a sprinkler head is intended to protrude.

18. An adjustable fire-suppression sprinkler head positioning assembly as set forth in claim 17, wherein said first and second conduits are cast.

19. An adjustable fire-suppression sprinkler head positioning assembly according to claim 17 wherein said first conduit and said second conduit are formed of black steel.

20. An adjustable fire-suppression sprinkler head positioning assembly according to claim 17 wherein said first conduit has a height which is about 6 times the minimum cross sectional diameter of the first conduit and wherein the second conduit has a height which is about 6 times the minimum cross sectional diameter of the second conduit.

21. An adjustable fire-suppression sprinkler head positioning assembly according to claim 17 wherein said first conduit and said second conduit when connected together have a total height which is about 10 times the minimum cross sectional diameter of the second conduit.

22. An adjustable fire-suppression sprinkler head positioning assembly comprising:
a first conduit having a first conduit inlet and a first conduit outlet wherein a center line of the first conduit outlet is offset from and parallel to a center line of the first conduit inlet, said first conduit inlet and said first conduit outlet being oriented to direct fluid flow in the same direction, the first conduit inlet and the first conduit outlet being substantially circular in cross section and the centerlines of said first conduit inlet and of said first conduit outlet being offset in the radial direction by a distance equal to at least the diameter of said first conduit inlet, said first conduit inlet comprising a socket, said socket being integral with said first conduit, a smooth outer circumferential surface with a smooth outer contour of a fitting provided on a sprinkler drop line which is disposed behind a surface from which a sprinkler head is intended to protrude being receivable within said socket, said socket having a set screw for securing said first conduit in a desired circumferential position relative to said sprinkler drop line, said socket further comprising sealing means for preventing fluid leakage between said first conduit inlet and said smooth outer circumferential surface with a smooth outer contour of said fitting provided on the sprinkler drop line, said first conduit outlet having a smooth outer circumferential surface with a smooth outer contour;
a second conduit having a second conduit inlet and a second conduit outlet wherein a center line of the second conduit outlet is offset from and parallel to a center line of the second conduit inlet, said second conduit inlet and said second conduit outlet being oriented to direct fluid flow in the same direction, the second conduit inlet and the second conduit outlet being substantially circular in cross section and the centerlines of said second conduit inlet and said second conduit outlet being offset in the radial direction by a distance equal to at least the diameter of said second conduit inlet, said second conduit inlet comprising a socket, said socket being integral with said second conduit, the smooth outer circumferential surface with a smooth outer contour of the first conduit outlet being receivable within said socket, said socket having a set screw for securing said second conduit in a desired circumferential position relative to said first conduit, said socket further comprising sealing means for preventing fluid leakage between said first conduit outlet and said second conduit inlet;

means for receiving a sprinkler head, said means for receiving being disposed at said second conduit outlet, said means for receiving comprising male threads provided on said second conduit outlet;

said first conduit including said socket of said first conduit inlet and said smooth outer circumferential surface with a smooth outer contour of said first conduit outlet being identical to said second conduit including said socket of said second conduit inlet and said second conduit outlet prior to receiving said male threads, whereby the same tooling forms both the first conduit and the second conduit;

whereby said means for receiving a sprinkler head may be variably positioned so as to be provided at a predetermined location along said surface from which a sprinkler head is intended to protrude.

23. An adjustable fire-suppression sprinkler head positioning assembly as set forth in claim 22, wherein said first and second conduits are formed of black steel.

24. An adjustable fire-suppression sprinkler head positioning assembly according to claim 22 wherein said first conduit and said second conduit are cast.

25. An adjustable fire-suppression sprinkler head positioning assembly according to claim 22 wherein said first conduit has a height which is about 6 times the minimum cross sectional diameter of the first conduit and wherein the second conduit has a height which is about 6 times the minimum cross sectional diameter of the second conduit.

26. An adjustable fire-suppression sprinkler head positioning assembly according to claim 22 wherein said first conduit and said second conduit when connected together have a total height which is about 10 times the minimum cross sectional diameter of the second conduit.

27. An adjustable fire-suppression sprinkler head positioning assembly according to claim 1, said inlet of said first conduit comprising a smooth outer circumferential surface with a smooth outer contour.

28. A fitting for use in an adjustable fire-suppression sprinkler head positioning assembly according to claim 27 wherein the other of said inlet and said outlet of said conduit comprises a second smooth outer circumferential surface.

* * * * *